(12) United States Patent
Qian et al.

(10) Patent No.: US 12,506,305 B2
(45) Date of Patent: Dec. 23, 2025

(54) POSITION ASSURANCE APPARATUS, CONNECTOR ASSEMBLY, BATTERY, AND POWER CONSUMPTION APPARATUS

(71) Applicant: CONTEMPORARY AMPEREX TECHNOLOGY (HONG KONG) LIMITED, Hong Kong (CN)

(72) Inventors: Mu Qian, Ningde (CN); Jinmei Xu, Ningde (CN); Xiaojun Yang, Ningde (CN); Shengkai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 499 days.

(21) Appl. No.: 18/166,919

(22) Filed: Feb. 9, 2023

(65) Prior Publication Data
US 2023/0187878 A1 Jun. 15, 2023

Related U.S. Application Data

(63) Continuation of application No. PCT/CN2021/120432, filed on Sep. 24, 2021.

(30) Foreign Application Priority Data

Sep. 24, 2020 (CN) .......................... 202011020089.X

(51) Int. Cl.
*H01R 13/641* (2006.01)
*B60L 50/64* (2019.01)
(Continued)

(52) U.S. Cl.
CPC .......... *H01R 13/6691* (2013.01); *B60L 50/64* (2019.02); *H01M 10/425* (2013.01);
(Continued)

(58) Field of Classification Search
None
See application file for complete search history.

(56) References Cited

U.S. PATENT DOCUMENTS

| 5,624,275 A | 4/1997 | Fukuda |
| 6,062,899 A | 5/2000 | Presley et al. |

(Continued)

FOREIGN PATENT DOCUMENTS

| CN | 101552399 A | 10/2009 |
| CN | 101821910 A | 9/2010 |

(Continued)

OTHER PUBLICATIONS

The European Patent Office (EPO) The Extended European Search Report for 21871115 Aug. 8, 2023, 13 Pages.

(Continued)

*Primary Examiner* — Tho D Ta
(74) *Attorney, Agent, or Firm* — ANOVA LAW GROUP, PLLC

(57) ABSTRACT

A position assurance apparatus includes a first connecting portion, and a second connecting portion configured to be electrically connected to the first connecting portion. The first connecting portion and the second connecting portion are configured to be electrically connected to a signal circuit through a first connector, so that the signal circuit is turned on in response to the first connector and a second connector being plugged into place.

14 Claims, 20 Drawing Sheets

(51) Int. Cl.
*H01M 10/42* (2006.01)
*H01M 50/545* (2021.01)
*H01R 13/66* (2006.01)

(52) U.S. Cl.
CPC ........ *H01M 50/545* (2021.01); *H01R 13/641* (2013.01); *H01R 2201/26* (2013.01)

(56) References Cited

U.S. PATENT DOCUMENTS

| | | | |
|---|---|---|---|
| 9,054,457 | B2 | 6/2015 | Odorfer et al. |
| 9,711,902 | B2 | 7/2017 | Kot et al. |
| 9,716,341 | B2 | 7/2017 | Yamane et al. |
| 9,780,502 | B2 | 10/2017 | Nuetzel et al. |
| 10,038,278 | B2 * | 7/2018 | Lane .................... H01R 13/641 |
| 10,218,117 | B1 | 2/2019 | Probert et al. |
| 2012/0112762 | A1 | 5/2012 | Odorfer et al. |
| 2013/0078835 | A1 | 3/2013 | Gunreben et al. |
| 2014/0364010 | A1 | 12/2014 | Kuwahara et al. |
| 2015/0171551 | A1 | 6/2015 | Iwatani |
| 2017/0012392 | A1 | 1/2017 | Kot et al. |
| 2017/0018889 | A1 | 1/2017 | Neutzel et al. |
| 2017/0133790 | A1 | 5/2017 | Yamane et al. |
| 2020/0028307 | A1 | 1/2020 | Demaratos |
| 2020/0153159 | A1 * | 5/2020 | Gartenmaier .......... H01R 43/26 |
| 2020/0176826 | A1 | 6/2020 | Yun et al. |

FOREIGN PATENT DOCUMENTS

| | | | |
|---|---|---|---|
| CN | 202205925 | U | 4/2012 |
| CN | 102460851 | A | 5/2012 |
| CN | 105531886 | A | 4/2016 |
| CN | 105789997 | A | 7/2016 |
| CN | 106340771 | A | 1/2017 |
| CN | 106654765 | A | 5/2017 |
| CN | 107026343 | A | 8/2017 |
| CN | 208336617 | U | 1/2019 |
| CN | 209298422 | U | 8/2019 |
| CN | 209298423 | A | 8/2019 |
| CN | 110612643 | A | 12/2019 |
| CN | 111095599 | A | 5/2020 |
| CN | 111180952 | A | 5/2020 |
| CN | 111585103 | A | 8/2020 |
| CN | 112310691 | A | 2/2021 |
| DE | 102016209472 | A1 | 11/2017 |
| EP | 2811586 | A1 | 12/2014 |
| EP | 3591769 | A1 | 1/2020 |
| JP | H0545935 | U * | 6/1993 |
| JP | 2006351415 | A | 12/2006 |
| JP | 2009206095 | A | 9/2009 |
| WO | 2011124563 | A1 | 10/2011 |
| WO | 2016082326 | A1 | 6/2016 |
| WO | 2017207453 | A1 | 12/2017 |
| WO | 2018220180 | A1 | 12/2018 |

OTHER PUBLICATIONS

The European Patent Office (EPO) The Extended European Search Report for 21871615 Sep. 1, 2023 19 Pages.
The State Intellectual Property Office of People's Republic of China The First Office Action for Application No. 202180049001 Apr. 22, 2025 21 Pages(including translation).
United States Patent and Trademark Office (USPTO) Non-final Rejection for U.S. Appl. No. 18/061,484, filed Mar. 11, 2025 66 Pages.
The World Intellectual Property Organization (WIPO) International Search Report and Written Opinion for PCT/CN2021/111603 Oct. 25, 2021 16 pages (including translation).
The World Intellectual Property Organization (WIPO) International Search Report and Written Opinion for PCT/CN2021/120432 Dec. 30, 2021 16 pages (including translation).
The China National Intellectual Property Administration (CNIPA) First Office Action for 202011020089.X Aug. 3, 2022 16 Pages (including Translation).

* cited by examiner

POSITION ASSURANCE APPARATUS, CONNECTOR ASSEMBLY, BATTERY, AND POWER CONSUMPTION APPARATUS

CROSS-REFERENCE TO RELATED APPLICATIONS

The present application is a continuation of International Application No. PCT/CN2021/120432, filed on Sep. 24, 2021, which claims priority to Chinese Patent Application No. 202011020089.X, filed on Sep. 24, 2020 and entitled "POSITION ASSURANCE APPARATUS, CONNECTOR ASSEMBLY, BATTERY, AND POWER CONSUMPTION APPARATUS", the entire contents of both of which are incorporated herein by reference.

TECHNICAL FIELD

The present application relates to a position assurance apparatus (Connector Position Assurance, CPA), a connector assembly including the position assurance apparatus, a battery including the connector assembly, a power consumption apparatus equipped with the battery, and a connector assembly system.

In another aspect, the present application further relates to a method of assembling the connector assembly.

BACKGROUND

When transmitting electrical and/or data and/or radio frequency signals, it is known to use a first connector and a second connector that are plugged into each other. To ensure signal transmission, it is required that the first connector and the second connector are plugged into place during application, and effectiveness of plug cannot be inadvertently destroyed during use, thereby ensuring power, optical or data connections. However, during an actual use, the first connector and the second connector often appear to be plugged into place when viewed from the outside, but they are not actually plugged into place. In order to prevent such risks, there is an urgent need for an apparatus that may reflect in a reliable manner whether the paired connectors are plugged into place.

SUMMARY

A purpose of the present application is to provide a position assurance apparatus, a connector assembly, a battery, a power consumption apparatus and a connector assembly system, which is intended to reflect in a reliable manner whether the paired connectors are plugged into place, so as to avoid security risks due to the connector being not plugged into place.

A first aspect of the present application relates to a position assurance apparatus configured to ensure a first connector and a second connector to be plugged into place, where the position assurance apparatus includes:
  a first connecting portion; and
  a second connecting portion configured to be electrically connected to the first connecting portion,
  where the first connecting portion and the second connecting portion are configured to be electrically connected to a signal circuit through the first connector, so that the signal circuit is turned on when the first connector and the second connector are plugged into place.

In some embodiments of the present application, the first connecting portion includes two oppositely arranged elastic pieces, each of the elastic pieces has an elastic contact portion, and the elastic contact portion is configured to be electrically connected to the first connector.

In some embodiments of the present application, the elastic piece has an indentation, and the indentation is configured to reduce a distance between the elastic contact portions of the two elastic pieces, in order to ensure at least a part of the first connector plugged between the elastic contact portions of the two elastic pieces to be in close contact with the elastic contact portions.

In some embodiments of the present application, the position assurance apparatus includes a conductive base, the conductive base has a shape of a hollow sleeve, the conductive base includes a first end portion and a second end portion oppositely arranged, and the first connecting portion and the second connecting portion are configured to be connected to the first end portion.

In some embodiments of the present application, the position assurance apparatus includes a body portion, the body portion is provided with a slot, and the second end portion of the conductive base is configured to match with the slot so that the conductive base is mounted on the body portion.

In some embodiments of the present application, the first connector includes: a first LIN line welding leg, a second LIN line welding leg; the first connecting portion and the second connecting portion configured to be electrically connected to the first LIN line welding leg and the second LIN line welding leg respectively to turn on the signal circuit when the first connector and the second connector are plugged into place.

A second aspect of the present application relates to a connector assembly, including: a first connector configured to be connected to a signal circuit; a second connector having an opening and configured to be plugged into the first connector; and the position assurance apparatus according to the first aspect of the present application, the position assurance apparatus being configured to be pressed into the opening and turn on the signal circuit when the first connector and the second connector are plugged into place.

In some embodiments of the present application, the connector assembly includes a limiting member configured to prevent the position assurance apparatus from being pressed into the opening and turning on the signal circuit through the first connector when the first connector and the second connector are not plugged into place.

In some embodiments of the present application, the limiting member includes: a first limiting element arranged on the second connector; a second limiting element arranged on the position guarantee apparatus, where the first limiting element is configured to be in a first position to cooperate with the second limiting element to prevent the position assurance apparatus from being pressed into the opening to turn on the signal circuit, and the position assurance apparatus is allowed to be pressed into the opening and turn on the signal circuit while in a second position.

In some embodiments of the present application, the second limiting element includes elastic members arranged on both sides of the position assurance apparatus, and the elastic member is configured to protrude from the opening when the first limiting element rotates to the first position, so as to prevent the position assurance apparatus from being pressed into the opening.

In some embodiments of the present application, the first limiting element is a rotating member, the rotating member has a protruding portion, and the protruding portion is configured to squeeze the elastic member when the first limiting member rotates to the second position, so as to press the elastic member into the opening, thereby causing the position assurance apparatus to be pressed into the opening.

In some embodiments of the present application, the first limiting element is a sliding member, the sliding member has a step portion, and the step portion is configured to allow the position assurance apparatus to be pressed into the opening and turn on the signal circuit when the first limiting element moves to the second position.

In some embodiments of the present application, the second limiting element includes an abutting portion, and the abutting portion is configured to abut against the step portion when the first limiting element moves to the first position, so as to prevent the position assurance apparatus from being pressed into the opening.

A third aspect of the present application relates to a battery, including: a battery cell; the connector assembly according to the second aspect of the present application; a circuit board including a signal circuit configured to ensure the apparatus to be turned on when a first connector and a second connector are plugged into place; and a battery management system configured to detect a voltage of the signal circuit, and to issue an alarm signal when the voltage is zero to indicate that the connector assembly is not plugged into place.

A fourth aspect of the present application relates to a power consumption apparatus of a battery, including the battery according to the third aspect.

A fifth aspect of the present application relates to a connector assembly system, including a first assembly apparatus configured to plug a first connector and a second connector of a connector assembly into place; a second assembly apparatus configured to press a position assurance apparatus into an opening of the second connector and turn on a signal circuit through the first connector.

A sixth aspect of the present application relates to a method of assembling a connector assembly, including the following steps of: plugging a first connector and a second connector of the connector assembly into place; and pressing the position assurance apparatus according to the first aspect of the present application into an opening of the second connector and turning on a signal circuit through the first connector.

In some embodiments of the present application, the method of assembling the connector assembly further includes the following step of: operating a limiting member to prevent the position assurance apparatus from being pressed into the opening and turning on the signal circuit through the first connector when the first connector and the second connector are not plugged into place.

A connector assembly with the position assurance apparatus according to the present application has the following advantages:
(i) a signal circuit from a circuit board is used to determine whether the paired connectors are plugged into place, and a detection method is simple and effective compared with a traditional manual marking method;
(ii) during use of a vehicle, it is possible to directly detect whether the connector assembly fails, which improves safety of the connector assembly in use; and
(iii) compared with a traditionally used high voltage interlock connector or a position assurance apparatus microswitch, a detection cost is reduced.

Another aspect of the present application provides a first connector, including a protruding portion configured to be plugged into a second connector; a conductive portion configured to turn on a signal circuit and a position assurance apparatus when the first connector and the second connector are plugged into place; and a communication portion configured to receive a notification signal from a battery management system, and transmit the notification signal to a vehicle controller through the second connector to notify the vehicle controller that the first connector and the second connector have been plugged into place.

In this embodiment, the conductive portion and the communication portion are simultaneously provided in the first connector, that is, the conductive portion and the communication portion are integrated into one first connector. In this way, on the one hand, space and cost may be saved, and on the other hand, multiple connectors may be no longer used, thereby reducing failure rate and improving reliability of the connector.

In some embodiments, the conductive portion includes a first LIN line welding leg and a second LIN line welding leg configured to turn on the signal circuit and the position assurance apparatus.

In some embodiments, the communication portion includes a third LIN line welding leg configured to receive a notification signal from a battery management system.

In some embodiments, a distance between the first LIN line welding leg and the second LIN line welding leg is less than a distance between the third LIN line welding leg and the first LIN line welding leg or the second LIN line welding leg. In this way, interference with the third LIN line welding leg may be prevented when the position assurance apparatus is connected to the first connector.

In some embodiments, the first LIN line welding leg, the second LIN line welding leg and the third LIN line welding leg are arranged in a row.

Another aspect of the present application provides a second connector, including a recessed portion configured to be plugged with a first connector, the first connector including a conductive portion and a communication portion; a first guide portion configured to guide the conductive portion to be connected to a position assurance apparatus; a LIN line; and a second guide portion configured to guide the communication portion to be connected to the LIN line, a signal from a battery management system being transmitted to a vehicle controller through a connection between the communication portion and the LIN line when the first connector and the second connector are plugged into place, so as to notify the vehicle controller that the first connector and the second connector are plugged into place.

In this embodiment, the first guide portion and the second guide portion are simultaneously provided in the second connector, so that one connector may be used to implement connection and guidance of the conductive portion and the communication portion. In this way, on the one hand, space and cost may be saved, and on the other hand, multiple connectors may be no longer used, thereby reducing failure rate and improving reliability of the connector.

In some embodiments, the first guide portion includes: a first via and a second via, and positions of the first via and the second via correspond to the first LIN line welding leg and the second LIN line welding leg of the conductive portion.

In some embodiments, the second guide portion includes a third via, and a position of the third via corresponds to a third LIN line welding leg of the communication portion.

In some embodiments, a distance between the first via and the second via is less than a distance between the third via and the first via or the second via. In this way, interference with the third LIN line welding leg may be prevented when the position assurance apparatus is connected to the first connector.

In some embodiments, the first via, the second via and the third via are arranged in a row.

In some embodiments, the LIN line is configured to communicate the notification signal in a serial communication protocol.

Another aspect of the present application provides a battery management system, including: a detection unit configured to detect whether a signal circuit is turned on; a processing unit configured to generate a notification signal according to a detection result; and an output unit configured to transmit the notification signal to a vehicle controller through a second connector to notify the vehicle controller whether the first connector and the second connector are plugged into place.

In some embodiments, the detection unit detects whether the signal circuit is turned on by detecting whether the signal circuit has a voltage signal.

In some embodiments, when the voltage signal is a first value, such as a non-zero voltage, the detection unit detects that the signal circuit is turned on. Accordingly, the notification signal generated by the processing unit is a first notification signal configured to notify the vehicle controller that the first connector and the second connector have been plugged into place, and when the voltage signal is a second value, such as a zero voltage, the detection unit detects that the signal circuit is turned on, the notification signal generated by the processing unit is a second notification signal configured to notify the vehicle controller that the first connector and the second connector are not plugged into place.

BRIEF DESCRIPTION OF DRAWINGS

In order to further illustrate a position assurance apparatus, a connector assembly, a battery, a power consumption apparatus, a connector assembling system and a method of assembling the connector assembly according to the present application, the present application shall be described in detail below with reference to accompanying drawings and specific embodiments, where:

FIG. 14A is a top plan view of the connector assembly, FIG. 14B is a cross-sectional view of the connector assembly taken along an II-II line shown in FIG. 14A, and FIG. 14C is a cross-sectional view of the connector assembly taken along an line shown in FIG. 14A;

FIG. 14D is a top plan view of the connector assembly, FIG. 14E is a cross-sectional view of the connector assembly taken along an IV-IV line shown in FIG. 14D, and FIG. 14F is a cross-sectional view of the connector assembly taken along an V-V line shown in FIG. 14D.

DESCRIPTION OF EMBODIMENTS

Figure 1:
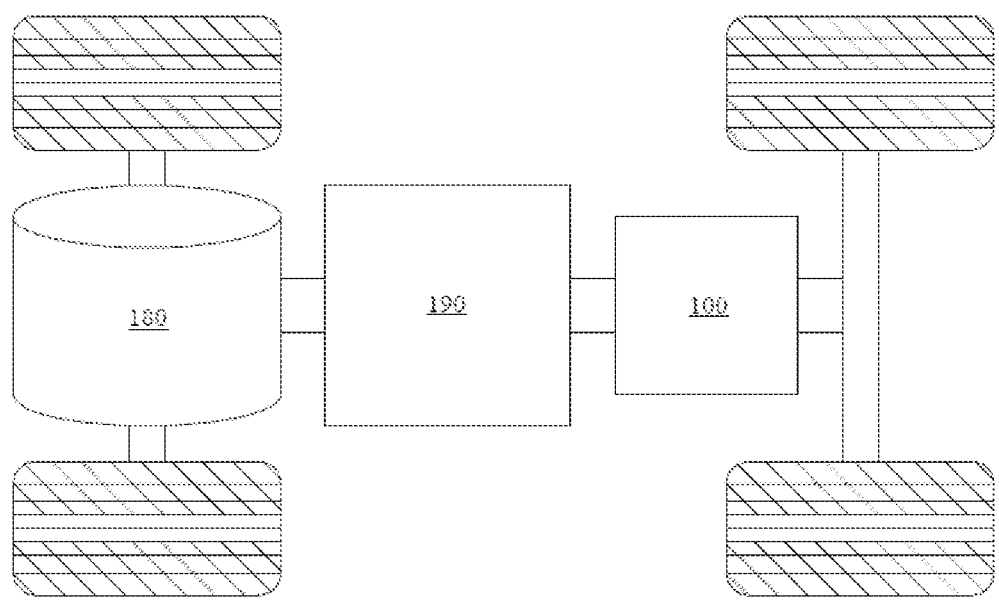
FIG. 1 is a schematic structural diagram of a vehicle according to an embodiment of the present application.

A position assurance apparatus 150, a connector assembly 120, a battery 100, a power consumption apparatus, a connector assembling system, and a method of assembling the connector assembly 120 according to the present application shall be described below with reference to the accompanying drawings, where same components are marked by same reference numerals.

It should be noted that embodiments described in the specification merely cover a part, but not all, of the embodiments of the present application. All the other embodiments obtained by those of ordinary skill in the art based on the embodiments recorded in the specification without any creative labor shall fall within protection scope of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "including" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The terms used in the embodiments of this application are only intended to describe specific embodiments, but are not intended to limit this application. The terms of "a", "the", and "the foregoing" in singular forms used in the embodiments of this application and the appended claims are intended to include a plural form, unless other meanings are clearly indicated in a context.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. Those of ordinary skill in the art may appreciate the specific meanings of the foregoing terms in the present application according to specific circumstances.

In the description of the present application, the term "plugged into place" means that when a second connector in the paired connectors is plugged into the corresponding first connector, the second connector is firmly plugged into the first connector through a mechanical structure. Such meaning is easily understood and defined by those of ordinary skill in the art.

In the present application, a battery cell may include a lithium-ion secondary battery, a lithium-ion primary battery, a lithium-sulfur battery, a sodium/lithium-ion battery, a sodium-ion battery or a magnesium-ion battery, etc., which are not limited by the embodiments of the present application. The battery cell may be cylindrical, flat, cuboid or in another shape, which are not limited by the embodiments of the present application. The battery cell is generally divided into three types according to the way of packaging: a cylindrical battery cell, a prismatic battery cell and a pouch battery cell, which are not limited by the embodiments of the present application.

The battery mentioned in the embodiments of the present application refers to a single physical module including one or more battery cells to provide a higher voltage and capacity. For example, the battery mentioned in the present application may include a battery module, a battery pack or the like. The battery generally includes a box body for enclosing one or more battery cells. The box body may prevent a liquid or other foreign matters from affecting charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on movement of metal ions between the positive electrode sheet and the negative electrode sheet. The positive electrode sheet includes a positive electrode current collector and a positive electrode active material layer. The positive electrode active material layer is coated on a surface of the positive electrode current collector, the positive electrode current collector not coated with the positive electrode active material layer protrudes from the positive electrode current collector coated with the positive electrode active material layer, and the positive electrode current collector not coated with the positive electrode active material layer is used as a positive electrode tab. As an example, in a lithium-ion battery, a material of the positive electrode current collector may be aluminum, and the positive electrode active material may be lithium cobaltate, lithium iron phosphate, ternary lithium, lithium manganate, or the like. The negative electrode sheet includes a negative electrode current collector and a negative electrode active material layer. The negative electrode active material layer is coated on a surface of the negative electrode current collector, the negative electrode current collector not coated with the negative electrode active material layer protrudes from the negative electrode current collector coated with the negative electrode active material layer, and the negative electrode current collector not coated with the negative electrode active material layer is used as a negative electrode tab. A material of the negative electrode current collector may be copper, and the negative electrode active material may be carbon, silicon, or the like. In order to ensure that no fusing occurs when a large current passes, there is a plurality of positive electrode tabs which are stacked together, and there is a plurality of negative electrode tabs which are stacked together. A material of the isolation film may be PP, PE, or the like. In addition, the electrode assembly may be a winding structure or a laminated structure, and the embodiments of the present application are not limited thereto.

The applicant has found that although a traditional position assurance apparatus utilizes the mechanical structure to ensure that connector assemblies are fully plugged into each other, it cannot directly detect whether the connector assembly has been fully plugged into place. A usual method is to use manual marking to confirm that the connector is plugged into place, but its work accuracy and efficiency both need to be improved. In addition, a traditional connector position assurance apparatus is at risk of vibration failure or detachment when the connector assembly plugged into place is subjected to impact and/or vibration, but a user cannot directly detect whether the connector position assurance apparatus appears to the vibration failure or the detachment.

In view of this, the present application provides a position assurance apparatus to solve the above technical problems. The present application is different from a technical concept of confirming that the connector assembly is plugged into place using the mechanical structure in the existing technologies, it innovatively introduces a circuit into the connector assembly and judges whether the connector assembly is plugged into place by detecting whether the circuit is turned on, which obtains an unexpected technical effect.

The technical solution described in the embodiments of the present application is applicable to various apparatus using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, or the like.

It should be understood that the technical solution described in the embodiments of the present application is not only applicable to the devices described above, but also applicable to all devices using the batteries. However, for brief description, the following embodiments are all described by an example of an electric vehicle.

As shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. A drive motor 180 is mounted on front axle of two front wheels of the vehicle. In addition, the vehicle is also equipped with a controller 190 and a battery 100. As is well known to those of ordinary skill in the art, the controller 190 and battery 100 are typically arranged at an appropriate location on a main shaft of the vehicle in order to control operation of various components of the vehicle and to provide driving power for the vehicle.

In order to meet different power demands, the battery 100 may include a plurality of battery cells 100*a*, where the plurality of battery cells 100*a* may be in series connection, parallel connection or series-parallel connection. The series-parallel connection refers to a combination of series connection and parallel connection. The battery 100 may also be referred to as a battery pack. Optionally, the plurality of battery cells 100*a* may be first connected in series, in parallel or in series and parallel to form a battery module, and then a plurality of battery modules are connected in series, in parallel or in series and parallel to form the battery 100. That is, the plurality of battery cells 100*a* may directly form the battery 100, or may first form the battery module, and then battery modules form the battery 100.

Figure 2:
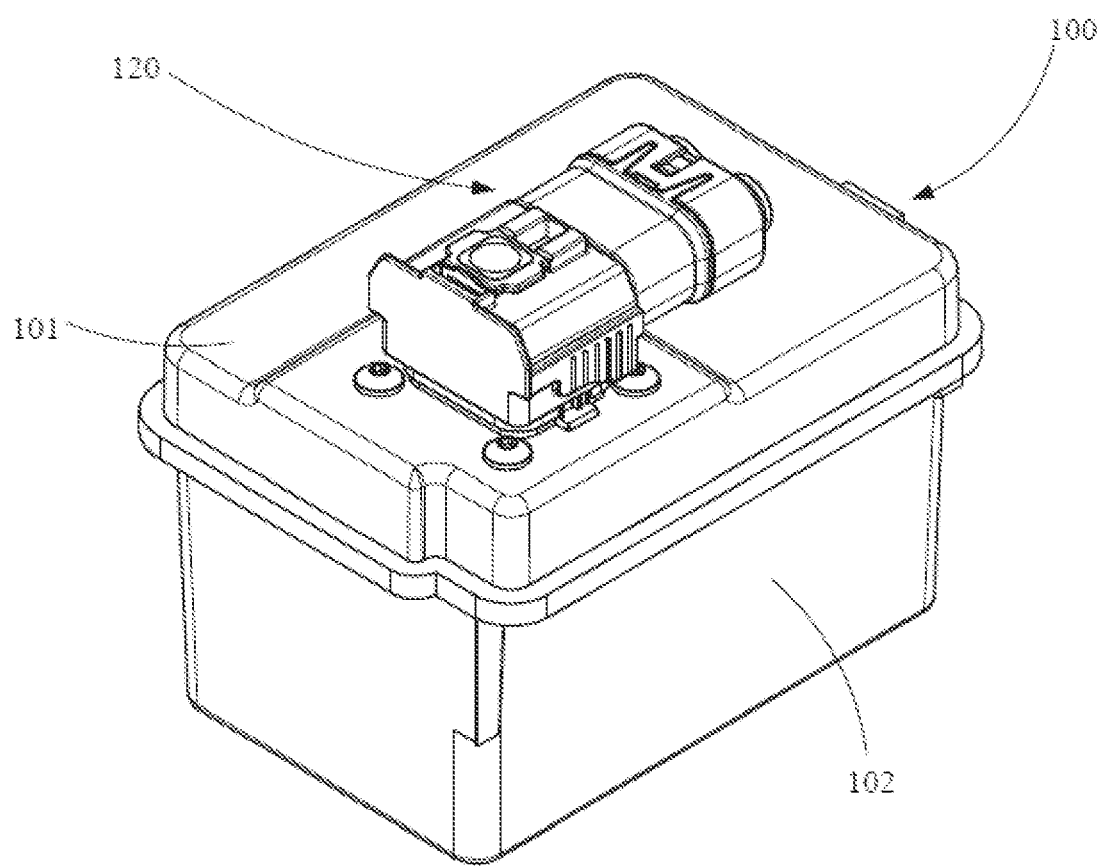
FIG. 2 shows a battery equipped with a connector assembly according to the present application.
Figure 3:
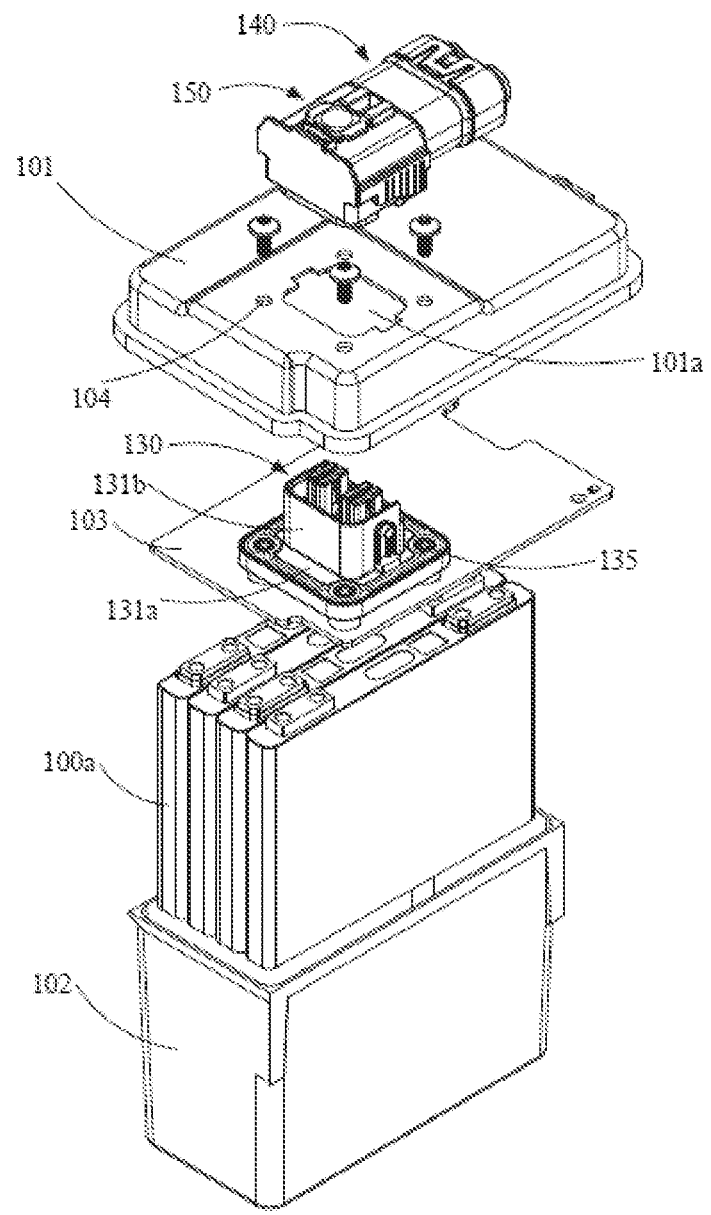
FIG. 3 is an exploded view of the battery shown in FIG. 2.

As shown in FIGS. 2 and 3, FIGS. 2 and 3 are respectively a schematic structural diagram and an exploded view of a battery 100 according to an embodiment of the present application. The battery 100 may include a plurality of battery cells 100*a*. The battery 100 may further include a box body, interior of the box body is a hollow structure, and a plurality of battery cells 100*a* are accommodated in the box body. As shown in FIG. 3, the box body may include two portions, which are respectively referred to as a housing 102 and a cover body 101, and the housing 102 and the cover body 101 are fastened together. The shape of the housing 102 and the cover body 101 may be determined in accordance with the shape of the plurality of battery cells 100*a*, and both the housing 102 and the cover body 101 may both have an opening. For example, the housing 102 and the cover body 101 each may be a hollow cuboid and only one face of each is an opening face, and the opening of the housing 102 is arranged opposite to the opening of the cover body 101, and the housing 102 and the cover body 101 are fastened to each other to form a box body with a closed chamber. The plurality of battery cells 100*a* are combined in parallel connection or series connection or series-parallel connection and are then placed in the box body formed by fastening the housing 102 to the cover body 101.

A circuit board 103 is placed in the housing 102 together with the battery cell 100*a*. A first connector 130 is mounted on the circuit board 103. A second connector 140 is plugged into the first connector 130 to constitute the paired connector assemblies 120. The first connector 130 includes a base portion 131*a* and a protruding portion 131*b* extending from the base portion 131*a* to the cover body 101 and extending out of the cover body 101, for plugging with the second connector 140. Correspondingly, the second connector 140 is provided with a recessed portion to be plugged with the first connector 130. The cover body 101 is openly provided with an avoidance hole 101*a* through which the protruding portion 131*b* of the first connector 130 protrudes out of the cover body 101 and is plugged into each other with the second connector 140 located outside the cover body 101. The base portion 131*a* of the first connector 130 is provided with at least one (four in this embodiment) fastening hole 135, and the same number of screw holes 104 are correspondingly arranged around the avoidance hole 101*a* of the cover body 101. The base portion 131*a* of the first connector 130 is fixed to the cover body 101 with a fastener (such as screws, bolts, or the like).

With the above arrangement, the base portion 131*a*, the circuit board 103 and the battery cell 100*a* of the first connector 130 are sealed in the housing 102, and the protruding portion 131*b* of the first connector 130 is configured to be plugged into each other with the second connector 140 outside the box body 101 through the avoidance hole 101*a*, and constitute the paired connector assemblies 120.

The circuit board 103 is also provided with a signal circuit configured to be turned on through a position assurance apparatus 150 when the first connector 130 and the second connector 140 are plugged into place. A specific structure of the position assurance apparatus 150 shall be described in detail below.

Figure 4:
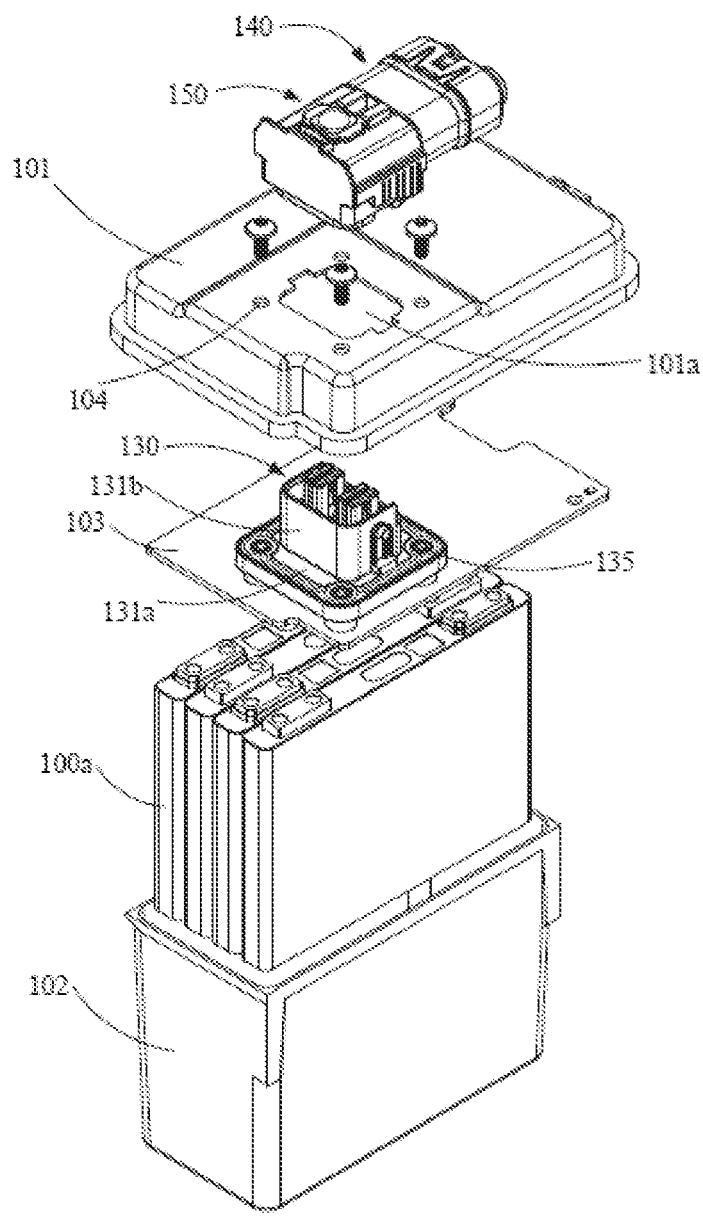
FIG. 4 is an exploded schematic view of an embodiment of a connector assembly according to the present application.
Figure 5:
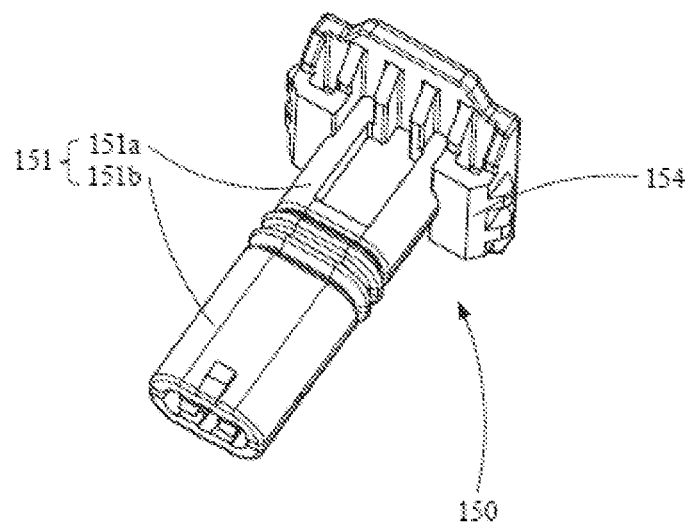
FIG. 5 is a perspective view of an embodiment of a position assurance apparatus used in a connector assembly.

The battery 100 further includes a battery management system (not shown in the figure) that may detect a voltage of the signal circuit and issue an alarm signal when the voltage is zero to indicate that the connector assembly 120 is not plugged into place. Of course, those of ordinary skill in the art may easily understand that means such as voice control and lighting may also be employed to indicate that the connector assembly 120 is not plugged into place, and these means should be regarded as equivalent embodiments of the present application. As shown in FIG. 4, FIG. 4 is an exploded schematic view of a connector assembly 120 according to an embodiment of the present application. The connector assembly 120 includes a first connector 130 for being connected to a signal circuit from a circuit board 103 (not shown in FIG. 4), a second connector 140 having an opening 146, and a position assurance apparatus 150. The second connector 140 is configured to be plugged into the first connector 130, and the position assurance apparatus 150 is configured to be pressed into the opening 146 and turn on the signal circuit when the first connector 130 and the second connector 140 are plugged into place.

The first connector 130 is internally provided with a metal power terminal 132, a local interconnect network (LIN) line welding leg 133, and a signal line pin 134, where one or more of the metal power terminal 132, the LIN line welding leg 133 and the signal wire pin 134 are directly soldered to the circuit board 103 by means such as wave soldering. The first connector 130 is integrally sealed with a socket sealing ring. The second connector 140 includes a plug body 141 provided with the opening 146, a wire cover 143 sealed to a first end of the plug body 141 with a wire sealing ring 142, and a sliding cover 145 that is arranged at a second end of the plug body 141 and may slide back and forth on the plug body 141. The second connector 140 utilizes a plug sealing ring 144 to implement an integral seal. Except for the plug body 141 provided with the opening 146 and the sliding cover 145, the above other components are known to those skilled in the art, and thus further description of these components is omitted.

FIGS. 5, 6, 7 and 8 are a perspective view, an exploded view, a side view and a cross-sectional view of a position assurance apparatus 150 according to an embodiment of the present application, respectively. Referring to FIGS. 5, 6, 7 and 8, the position assurance apparatus 150 includes a body portion 151, a sealing ring 152 and a conductive sheet 153. The body portion 151 is formed by injection molding, and a middle part of the body portion 151 is openly provided with a ring groove for accommodating the sealing ring 152, which divides the body portion 151 into two parts, an upper portion of the body 151*a* and a lower portion of the body 151*b*. At least one part of the upper portion of the body 151*a*, usually top two sides of the upper portion of the body 151*a*, is formed with an abutting portion 154, and a side of the abutting portion 154 facing towards the sealing ring 152 is a plane.

Continuing to refer to FIGS. 5, 6, 7 and 8, the lower portion of the body 151*b* is in a shape of a hollow sleeve, and a clamping portion 156 is formed in the hollow sleeve of the lower portion of the body 151*b* to clamp with the conductive sheet 153. In this embodiment, the clamping portion 156 is a bump protruding from an inner surface of the hollow sleeve, but those of ordinary skill in the art may also use other forms of elements to clamp the conductive sheet 153. After the conductive sheet 153 is clamped on the clamping portion 156 of the lower portion of the body 151*b*, the conductive sheet 153 is almost invisible when viewed from outside of the position assurance apparatus 150.

Figure 6A:
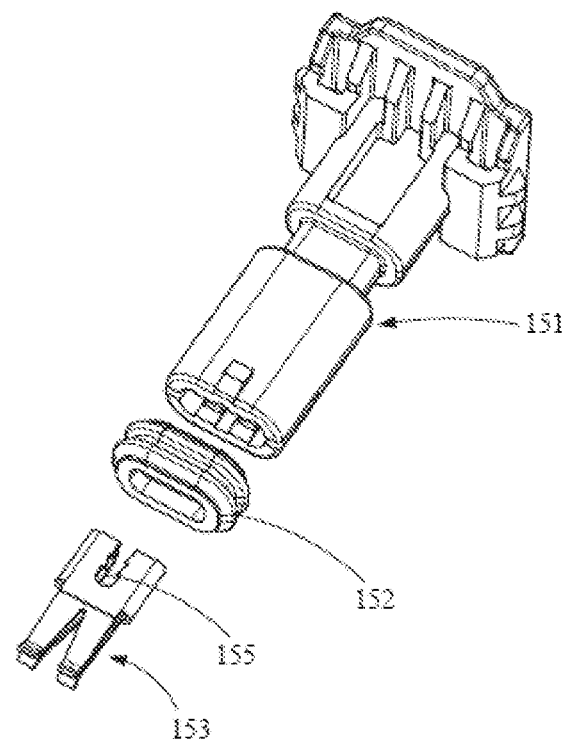
FIG. 6A is an exploded view of the position assurance apparatus shown in FIG. 5.

Referring to FIG. 2 and FIG. 6A, the conductive sheet 153 includes a first connecting portion 153*a* and a second connecting portion 153*b* electrically connected to the first connecting portion 153*a*, where the first connecting portion 153*a* and the second connecting portion 153*b* are configured to be electrically connected to a signal circuit (not shown in the figure) through the first connector 130, so that the signal circuit is turned on when the first connector 130 and the second connector 140 are plugged into place.

Figure 6B:
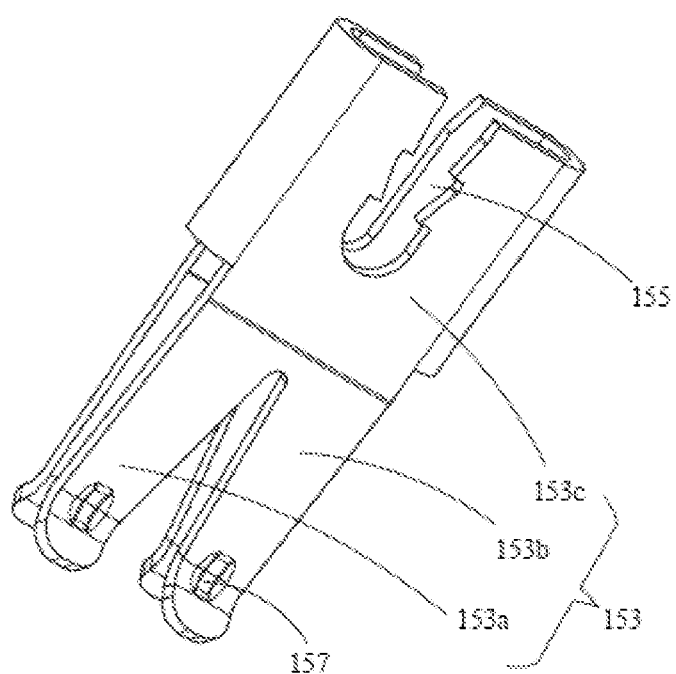
FIG. 6B is an enlarged schematic view of another embodiment of a conductive sheet of the position assurance apparatus shown in FIG. 6A.
Figure 7:
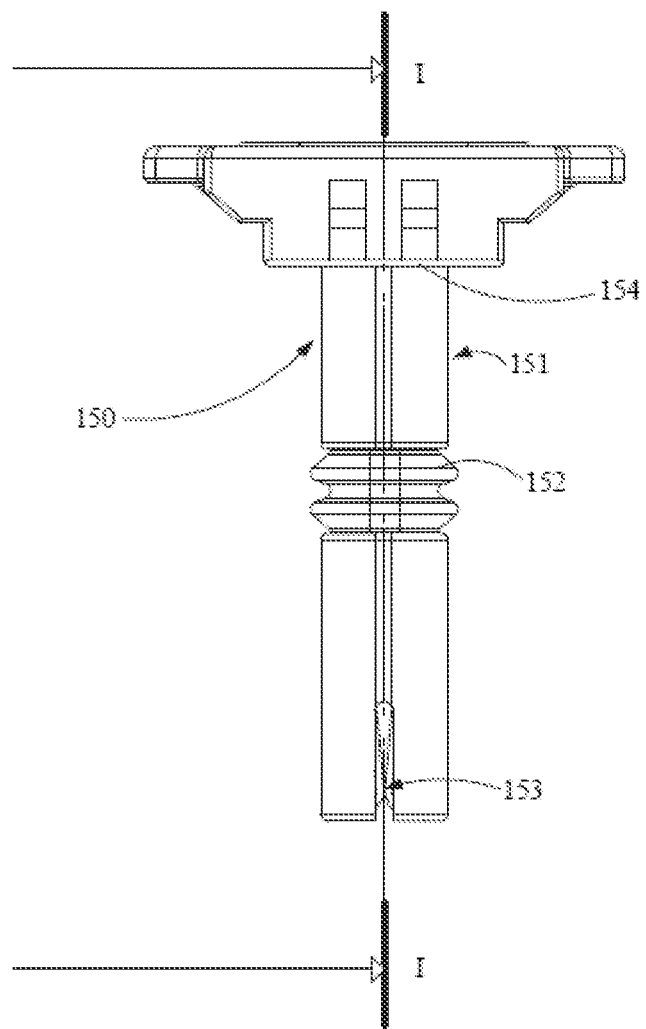
FIG. 7 is a side view of the position assurance apparatus shown in FIG. 5.
Figure 8:
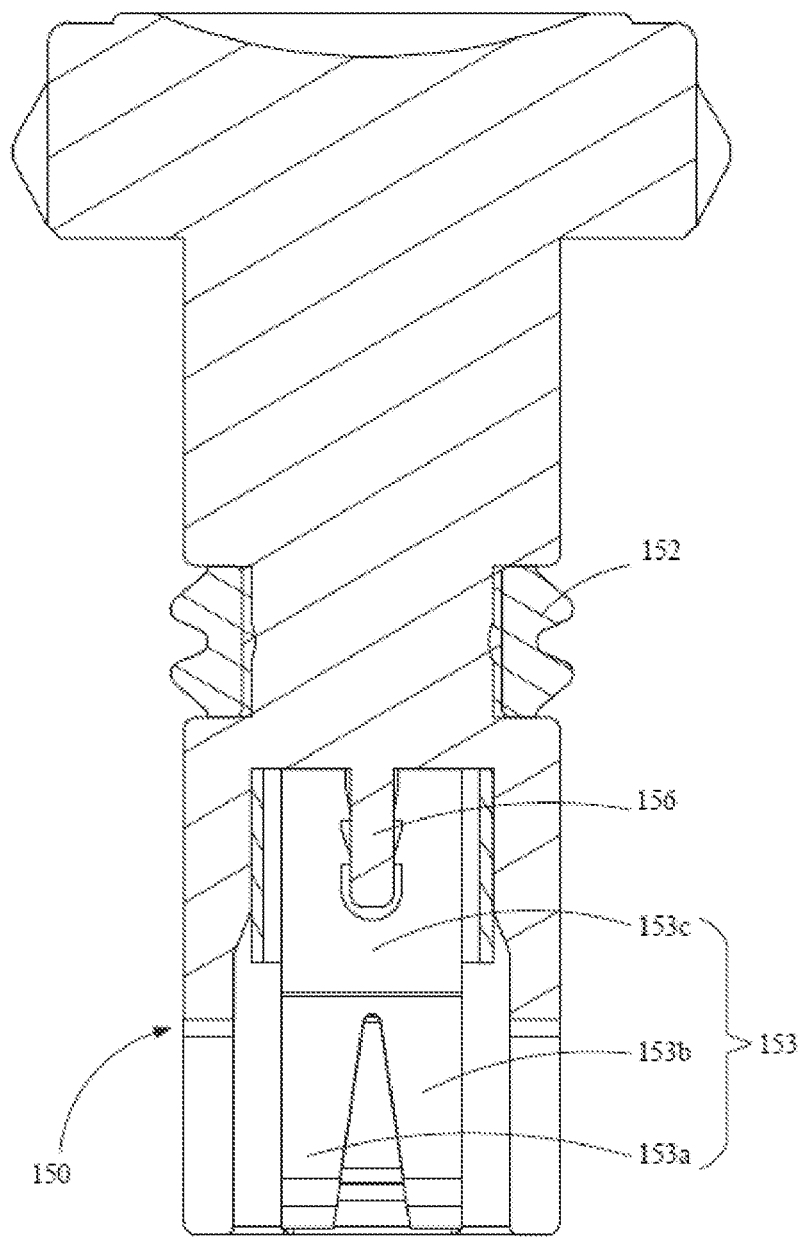
FIG. 8 is a cross-sectional view of a position assurance apparatus taken along an I-I line shown in FIG. 7.

FIG. 6B is an enlarged view of another embodiment of the conductive sheet 153 of FIG. 6A. This figure clearly shows a configuration of the conductive sheet 153 that is clamped inside the lower portion of the body 151*b*. Referring to FIG. 6B, it can be seen that the conductive sheet 153 includes at least a first connecting portion 153*a* and a second connecting portion 153*b* that are bifurcated in a "V" shape, both the first connecting portion 153*a* and the second connecting portion 153*b* are conductive, and may be made of metal, for example, and the first connecting portion 153*a* and the second connecting portion 153*b* are configured to be electrically connected to each other. The first connecting portion 153*a* and the second connecting portion 153*b* are also electrically connected to the signal circuit from the circuit board 103 through two of the three LIN line welding legs 133 of the first connector 130, so that the signal circuit is turned on when the first connector 130 and the second connector 140 are plugged into place.

In some embodiments, the first connecting portion 153*a* includes two oppositely arranged elastic pieces, each of the elastic pieces has an elastic contact portion, and the elastic contact portion is configured to be electrically connected to the first connector 130.

As shown in FIG. 6B, the first connecting portion 153*a* is composed of a pair of elastic pieces arranged opposite to each other, and each of the elastic pieces is an elastic elongated metal piece. Ends of the pair of elastic pieces approach each other and are bent to form the elastic contact portion. A gap allowing the LIN line welding leg 133 of the first connector 130 to be plugged therein is formed between the elastic contact portions of the two elastic pieces. When the LIN line welding leg 133 is plugged into the gap formed by the elastic contact portions of the two elastic pieces, the LIN line welding leg 133 and the first connecting portion 153*a* are electrically connected to each other. The elastic piece further has an indentation 157 configured to reduce a distance between the elastic contact portions of the two elastic pieces to ensure that the elastic contact portions of the two elastic pieces may be in close contact with a conductor such as the LIN line welding leg 133. It can be understood that the second connecting portion 153*b* may have the same structure as the first connecting portion 153*a*, so that the position assurance apparatus 150 and a signal line are turned on. Optionally, the conductive sheet 153 further includes a conductive base 153*c*. The conductive base 153*c* has a shape of a hollow sleeve, and includes a first end portion and a second end portion arranged opposite to each other, and the first connecting portion 153*a* and the second connecting portion 153*b* are connected to a first end portion of the conductive base 153*c*. Optionally, a second end portion of the conductive base 153*c* forms a clamping notch 155, and the shape of the clamping notch 155 is substantially the same as the clamping portion 156 of the lower portion of the body 151*b*. In this way, the conductive sheet 153 may be fixed in the body portion 151 of the position assurance apparatus 150 by a cooperation between the clamping notch 155 and the clamping portion 156. Optionally, a notch shape of the clamping notch 155 is serrated, so as to increase frictional force when the clamping notch 155 is clamping with the clamping portion 156. In order to prevent the position assurance apparatus 150 from being pressed into an opening 146 and turning on a signal circuit through the first connector 130 when the first connector 130 and the second connector 140 are not plugged into place, the connector assembly 120 is further provided with a limiting member.

In some embodiments, the limiting member may be separately provided on the position assurance apparatus 150, the first connector 130 or the second connector 140. No matter on which position it is provided, it only needs to be able to prevent the position assurance apparatus 150 from being pressed into the opening 146 of the second connector 140 when the first connector 140 and the second connector 140 are not plugged into place. For example, the limiting member may be a latch separately provided on the position assurance apparatus 150. When the connector assembly 120 is not plugged into place, the latch may abut against the second connector 140 to prevent the position assurance apparatus 150 from being pressed into the opening 146, and when the connector assembly 120 is plugged into place, the latch may be removed, thereby allowing the position assurance apparatus 150 to be pressed into the opening 146.

In some embodiments, the limiting member includes: a first limiting element arranged on the second connector; a second limiting element arranged on the position guarantee apparatus, where the first limiting element is configured to be in a first position to cooperate with the second limiting element to prevent the position securing apparatus from being pressed into the opening to turn on the signal circuit, and the position assurance apparatus is allowed to be pressed into the opening and turn on the signal circuit while in a second position. Specifically, the limiting member is composed of at least two parts, namely: a first limiting element located in the second connector 140 and a second limiting element located in the position assurance apparatus 150, where the first limiting element is configured to be in the first position to cooperate with the second limiting element to prevent the position securing apparatus 150 from being pressed into the opening 146 to turn on the signal circuit, and the position assurance apparatus 150 is allowed to be pressed into the opening 146 and turn on the signal circuit while in the second position.

As shown in FIG. 4, a first limiting element is a sliding member having a step portion 147, that is, a sliding cover 145, and a second limiting element is an abutting portion 154 on a position assurance apparatus 150. The step portion 147 is formed on the top of the sliding cover 145 and protrudes from the top of the sliding cover 145. An inner wall of the sliding cover 145 is formed with a sliding groove 148 or a similar structure for the sliding cover 145 to slide on the second connector 140. When the sliding cover 145 and the step portion 147 thereon slide to a first position on the second connector 140, the abutting portion 154 provided on the top of a body portion 151 of the position assurance apparatus 150 shall abut against the step portion 147 on the top of the sliding cover 145 to prevent the position assurance apparatus 150 from being pressed into an opening 146. And when the sliding cover 145 and the step portion 147 thereon slide to a second position, the first connector 130 and the second connector 140 are plugged into place, and the abutting portion 154 shall no longer contact the step portion 147, so the position assurance apparatus 150 is allowed to be pressed into the opening 146 and turn on a signal circuit of a circuit board 103.

The following shall briefly describe four operation steps of assembling a connector assembly 120 with reference to FIGS. 9A-9D, where schematic diagrams of the connector assembly 120 in four states of unassembled, pre-assembled, plugged into place and assembled in place are respectively shown. Among them, when the connector assembly 120 is in states of unassembled and pre-assembled, a sliding cover 145 is configured to be in a first position: that is, a step portion 147 abuts against an abutting portion 154 to prevent a position assurance apparatus 150 from being pressed into an opening 146 to turn on a signal circuit, and when the connector assembly 120 is in states of plugged into place and assembled in place, the sliding cover 145 is configured to be in a second position: that is, the step portion 147 no longer abuts against the abutting portion 154 to allow the position assurance apparatus 150 to be pressed into the opening 146 to turn on the signal circuit.

Figure 9A:
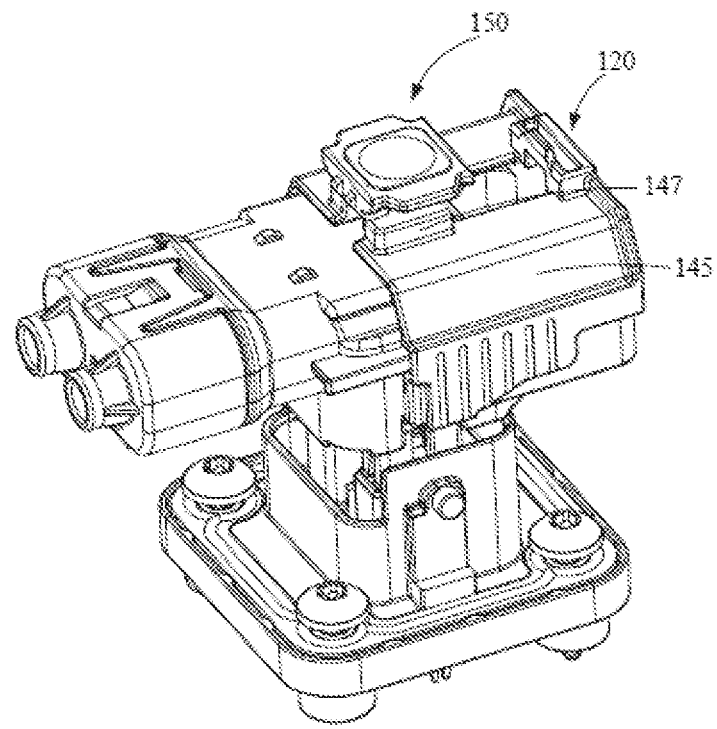
FIGS. 9A-9D show operation steps of the connector assembly shown in FIG. 4, where schematic diagrams of the connector assembly in four states of unassembled, pre-assembled, plugged into place and assembled in place are respectively shown.

As shown in FIG. 9A, when the connector assembly 120 is in an unassembled state, a first connector 130 and a second connector 140 are in a separation state. Optionally, the position assurance apparatus 150 may be directly mounted on the first connector 130 to reduce the number of parts to be assembled and improve installation efficiency. When the connector assembly 120 is in the unassembled state, the step portion 147 on the sliding cover 145 abuts against the abutting portion 154 of the position assurance apparatus 150 to prevent the position assurance apparatus 150 from being pressed down into the opening 146 of the second connector 140 to turn on the signal circuit.

Figure 9B:
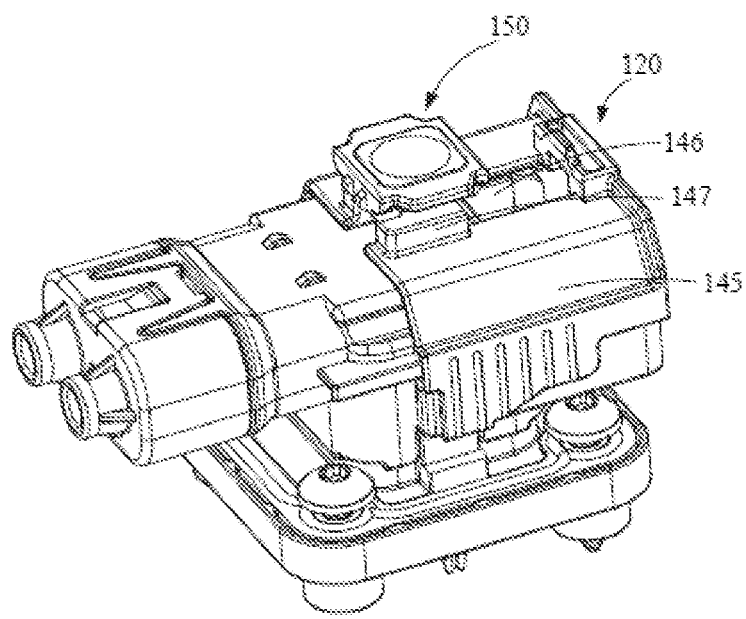

As shown in FIG. 9B, when the connector assembly 120 is in a pre-assembled state, a part of the second connector 140 is plugged into the first connector 130, and at this time, the connector assembly 120 is not plugged into place. Continuing to refer to FIG. 4 and FIG. 9B, in this state, a limiting pin 136 fixed on the first connector 130 has just been plugged into a sliding groove 148 inside the sliding cover 145. At this time, the step portion 147 on the top of the sliding cover 145 still abuts against the abutting portion 154 of the position assurance apparatus 150 to prevent the position assurance apparatus 150 from being pressed into the opening 146.

Figure 9C:
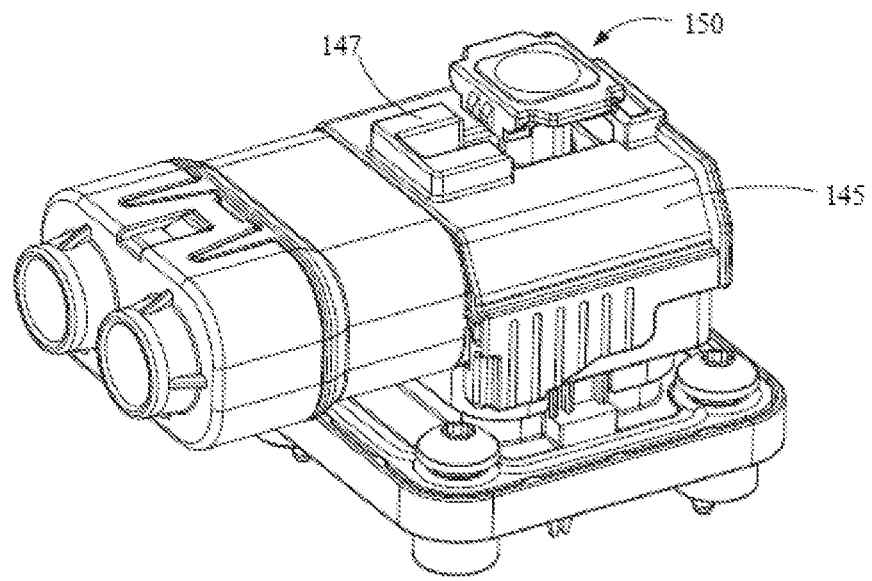

As shown in FIG. 9C, at this time, the second connector 140 is completely plugged into the first connector 130, and the connector assembly 120 is in a state of being plugged into place. Continuing to refer to FIG. 4 and FIG. 9C, the limiting pin 136 fixed on the first connector 130 is plugged into the sliding groove 148 inside the sliding cover 145. Since the sliding groove 148 is a broken line, when external force pushes the sliding cover 145 to move, the second connector 140 moves along the sliding groove 148, so that the second connector 140 moves downward and is completely plugged into the first connector 130 while horizontally moving towards left, so as to implement that the first connector 130 and the second connector 140 are plugged into place, and at the same time, the step portion 147 of the second connector 140 no longer abuts against the abutting portion 154 of the position assurance apparatus 150. At this time, a limiting function of the limiting member is removed, allowing the position assurance apparatus 150 to be pressed into the opening 146.

Figure 9D:
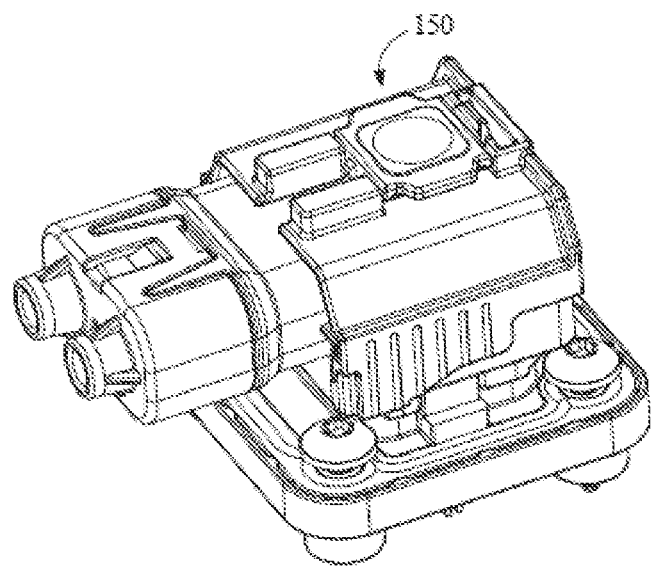

As shown in FIG. 9D, at this time, the connector assembly 120 is in a state of being plugged into place. The position assurance apparatus 150 is pressed into the opening 146 and fastened so that a signal circuit from a circuit board 103 is turned on, indicating that the first connector 130 and the second connector 140 are plugged into place. Optionally, in order to implement fastening of the position assurance apparatus 150, a locking structure may be provided on the position assurance apparatus 150 and/or the sliding cover 145. For example, the position assurance apparatus 150 and the sliding cover 145 are respectively provided with a buckle bulge and an occlusal recess, so that after the position assurance apparatus 150 is pressed down, the buckle bulge is pressed into the occlusal recess of the sliding cover 145 to implement fastening.

Figure 10:
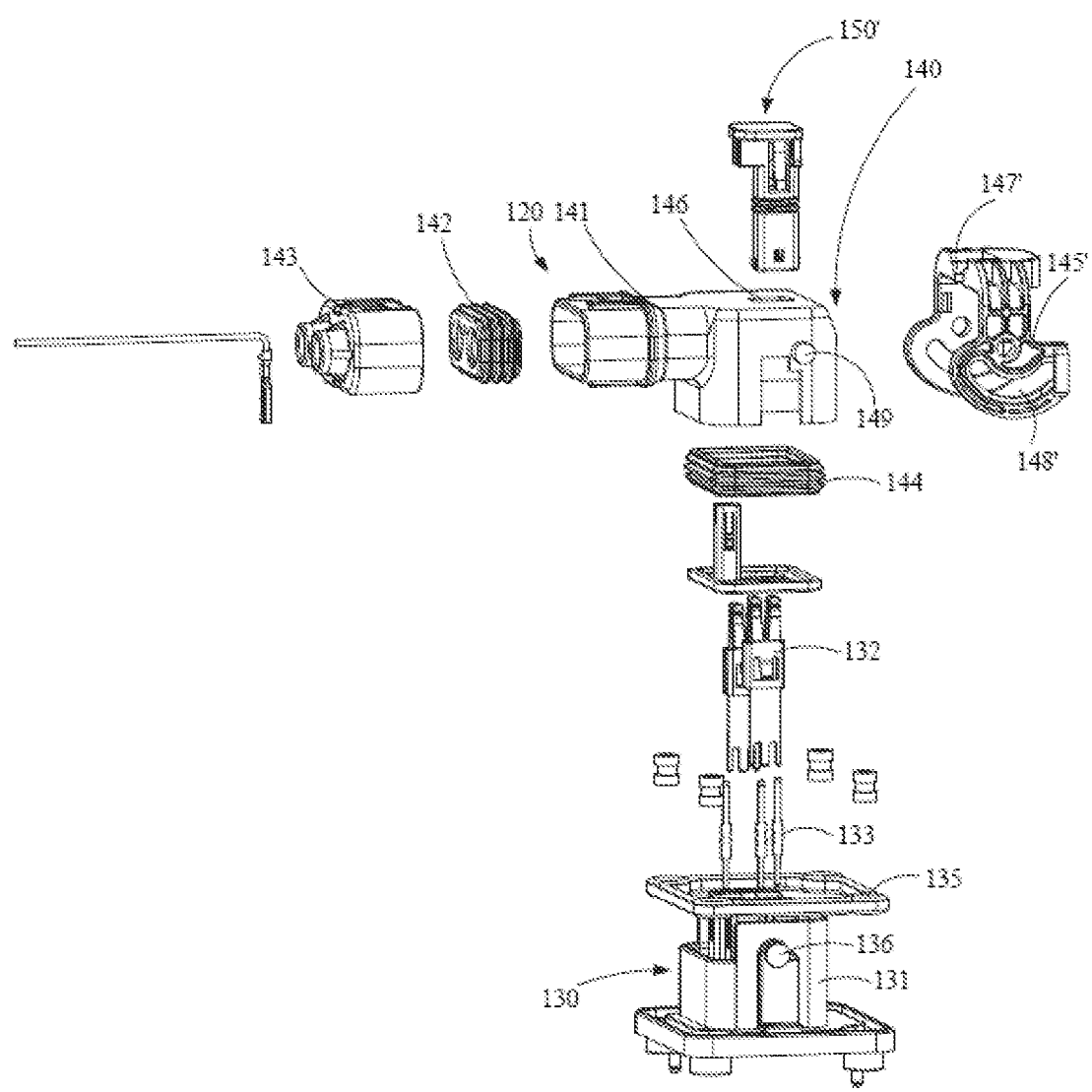
FIG. 10 is an exploded schematic view of another embodiment of a connector assembly according to the present application.

FIG. 10 is an exploded schematic view of another embodiment of a connector assembly 120 according to the present application. A position assurance apparatus 150' is also configured to be pressed into an opening 146 and turn on a signal circuit when a first connector 130 and a second connector 140 are plugged into place.

The structure of the first connector 130 in this embodiment is substantially the same as the structure of the first connector 130 in the above embodiments, but it should be illustrated that a protruding portion 131b of the first connector 130 is formed with a convex limiting pin 136, which may cooperate with a rotation limiting groove 148' formed on a rotating handle 145' in this embodiment to limit rotation of the rotating handle 145'. As for the second connector 140, in addition to using a rotating member instead of a sliding member as a first limiting element and forming an articulated pin 149 that articulates the rotating handle 145' to the second connector 140, other configurations are also substantially the same.

In this embodiment, the first limiting element is the rotating member having a protruding portion 147', that is, the rotating handle 145'. The rotating handle 145' is provided on a second end of a plug body 141 in a manner such as hinge and may rotate between a first position and a second position around a hinge pin 149.

As shown in FIG. 10, the rotating handle 145' has a roughly U-shaped overall shape, and its two ends are formed with a rotation limiting groove 148' having an arc shape as a whole and bending at a predetermined arc around a hinge hole hinged with a hinge pin 149. After a rotation limiting pin 136 of a first connector 130 is clamped and fitted into the rotation limiting groove 148', the rotating handle 145' may rotate around the hinge pin 149 within an angle range predetermined by the rotation limiting groove 148'.

Figure 11:
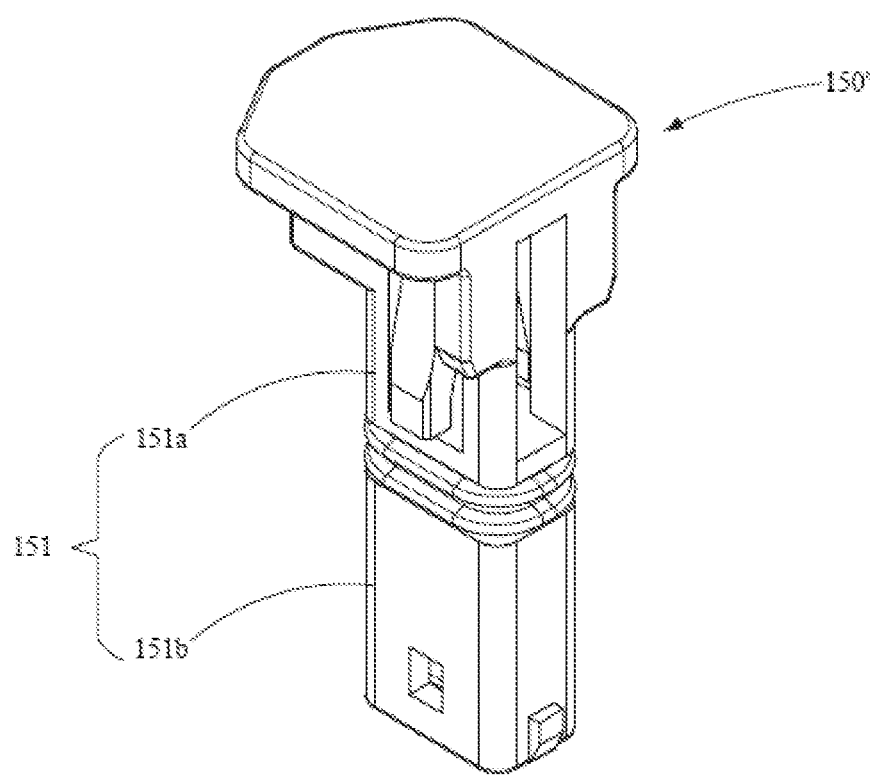
FIG. 11 is a perspective view of another embodiment of a position assurance apparatus used in a connector assembly.
Figure 12:
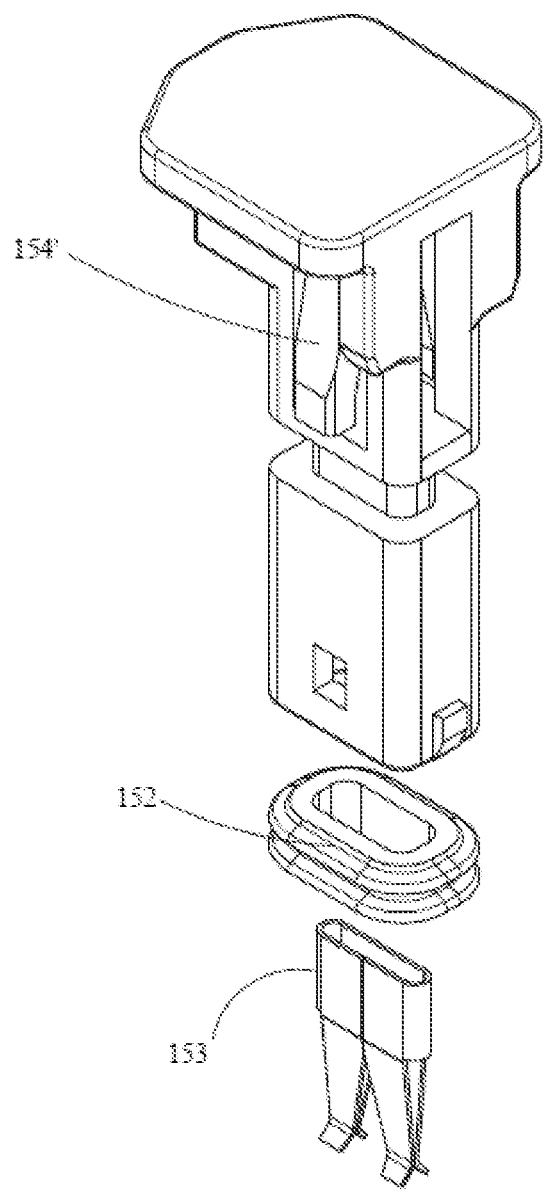
FIG. 12 is an exploded view of the position assurance apparatus shown in FIG. 11.

FIGS. 11 and 12 are respectively a perspective view and an exploded view of a position assurance apparatus 150' used in another embodiment of a connector assembly 120.

Similar to the above embodiments, a position assurance apparatus 150' in this embodiment includes a body portion 151, a sealing ring 152 and a conductive sheet 153. The body portion 151 is formed by injection molding, and a middle part of the body portion 151 is provided with a ring groove for accommodating the sealing ring 152, which divides the body portion 151 into two parts, an upper portion of the body 151a and a lower portion of the body 151b. The lower portion of the body is roughly in a shape of a hollow sleeve, or in other words, a slot for pressing the conductive sheet 153 is openly provided in the lower portion of the body. A difference between this embodiment and the above embodiments is: an elastic member 154' is formed on an upper portion of the body 151*a*, and the elastic member 154' is provided on both sides of the position assurance apparatus 150' as a second limiting element.

When a rotating handle 145' is in a first position, the elastic member 154' protrudes from an opening 146 of a second connector 140, thereby preventing the position assurance apparatus 150' from being pressed into the opening 146. When the rotating handle 145' is in a second position, a protruding portion 147' of the rotating handle 145' contacts and squeezes the elastic member 154' of the position assurance apparatus 150' to press the elastic member 154' into the opening 146, thereby causing the position assurance apparatus 150' to be pressed into the opening 146 and turn on a signal circuit from a circuit board 103.

The following shall briefly describe four operation steps of assembling a connector assembly 120 with reference to FIGS. 13A-13D, where schematic diagrams of the connector assembly 120 in four states of unassembled, pre-assembled, plugged into place and assembled in place are respectively shown. Among them, when the connector assembly 120 is in states of unassembled and pre-assembled, a rotating handle 145' is configured to be in a first position: that is, an elastic member 154' protrudes from an opening 146 to prevent a position assurance apparatus 150' from being pressed into the opening 146 to turn on a signal circuit, and when the connector assembly 120 is in states of plugged into place and assembled in place, the rotating handle 145' is configured to be in a second position: that is, the elastic member 154' no longer protrudes from the opening 146 to allow the position assurance apparatus 150' to be pressed into the opening 146 to turn on the signal circuit.

Figure 13A:
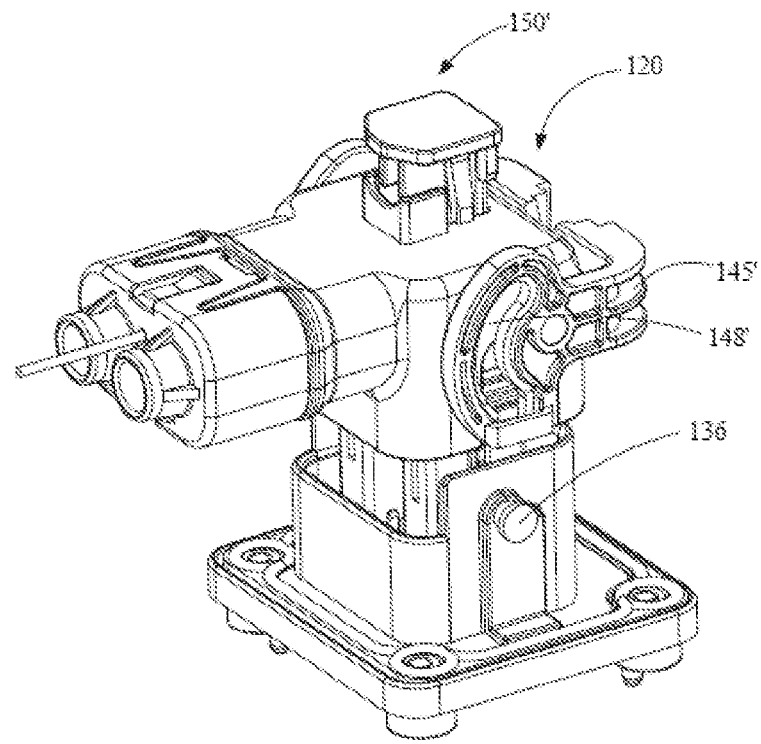
FIGS. 13A-13D show operation steps of the connector assembly shown in FIG. 10, where schematic diagrams of the connector assembly in four states of unassembled, pre-assembled, plugged into place and assembled in place are respectively shown.

As shown in FIG. 13A, when the connector assembly 120 is in an unassembled state, a first connector 130 and a second connector 140 are in a separation state. At this time, a limiting pin 136 of the first connector 130 has not been clamped and fitted into a rotation limiting groove 148', causing the rotating handle 145' and the position assurance apparatus 150' to be in a state of immobility.

Figure 13B:
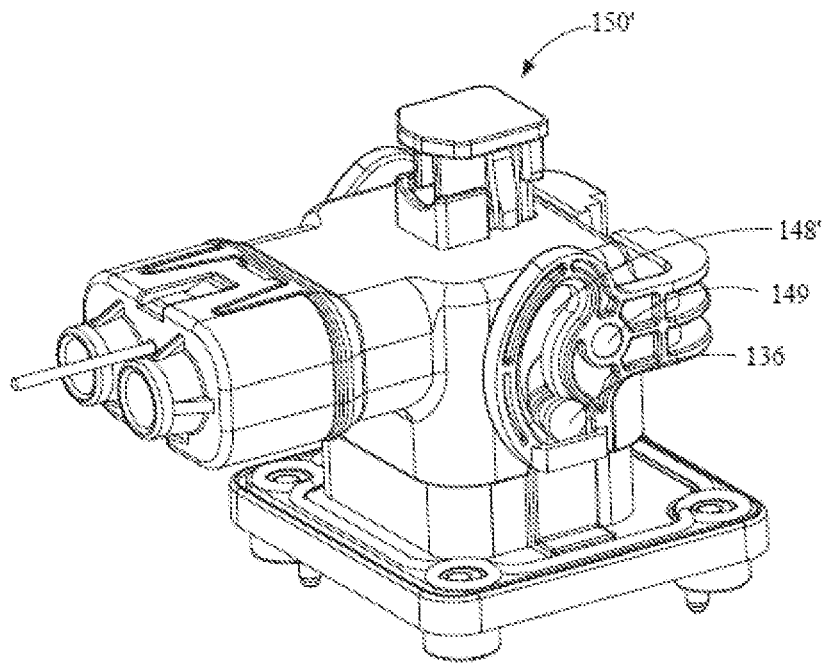

As shown in FIG. 13B, when the connector assembly 120 is in a pre-assembled state, a part of the second connector 140 is plugged into the first connector 130, and at this time, the limiting pin 136 of the first connector 130 is clamped and fitted into the rotation limiting groove 148', and the rotating handle 145' may rotate from a position of 180° in a horizontal direction around a hinge pin 149. At this time, the limiting pin 136 of the first connector 130 is located at a first limiting end of the rotation limiting groove 148'. However, the elastic member 154' of the position assurance apparatus 150' protrudes from the opening 146 of the second connector 140, thereby preventing the position assurance apparatus 150' from being pressed into the opening 146.

Figure 13C:
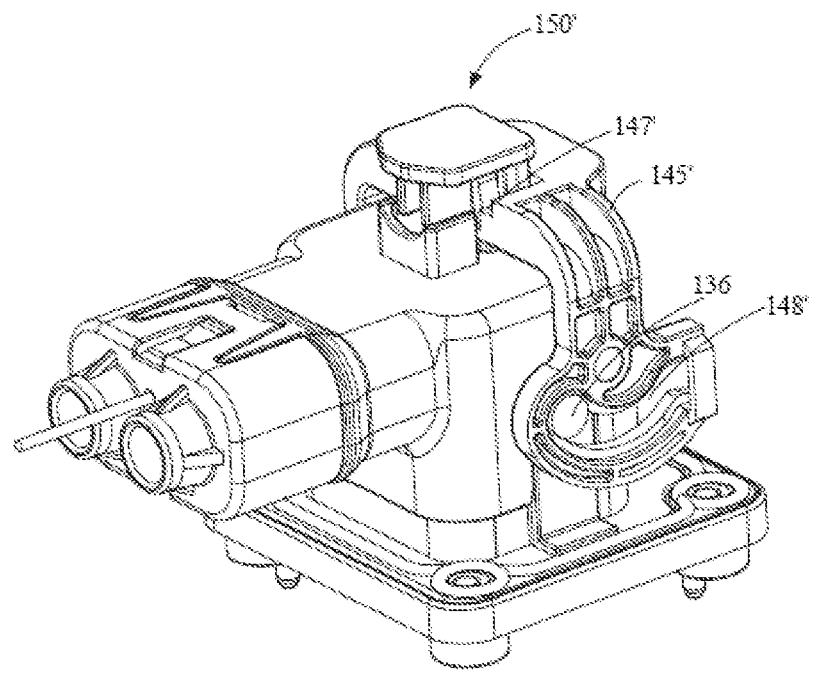

As shown in FIG. 13C, at this time, the second connector 140 is completely plugged into the first connector 130, and the connector assembly 120 is in a state of being plugged into place. During a process from pre-assembly to plug into place, the rotating handle 145' is rotated from the position of 180° in the horizontal direction to a position of 90° in a vertical direction, and the rotation limiting groove 148' moves relative to the limiting pin 136 in the following manner, that is, it moves from a first limiting end of the limiting pin 136 at the rotation limiting groove 148' to an opposite second limiting end of the limiting pin 136 at the rotation limiting groove 148'. At this time, the first connector 130 and the second connector 140 are plugged into place, and a protruding portion 147' of the rotating handle 145' contacts and squeezes the elastic member 154' of the position assurance apparatus 150' to press the elastic member 154' into the opening 146. And at this time, a limiting function of a limiting member is removed, thereby allowing the position assurance apparatus 150 to be pressed into the opening 146.

Figure 13D:
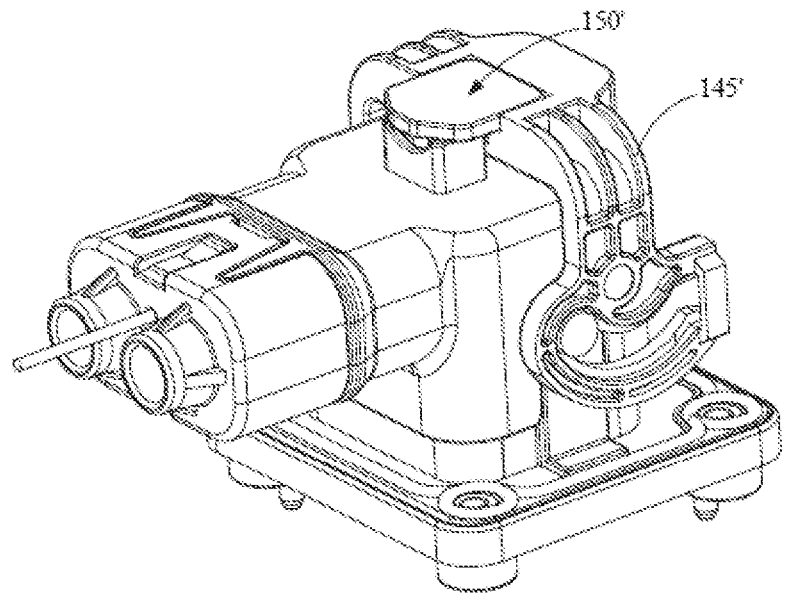

As shown in FIG. 13D, since the limiting pin 136 of the first connector 130 reaches the opposite second limiting end, the rotating handle 145' does not rotate any more. The position assurance apparatus 150 is pressed into the opening 146 and fastened so that the signal circuit from the circuit board 103 is turned on, indicating that the first connector 130 and the second connector 140 are plugged into place.

Several embodiments of the connector assembly 120 as described above are utilized to obtain a connector assembly system. The connector assembly system includes a first assembly apparatus and a second assembly apparatus, where the first assembly apparatus is configured to plug the first connector 130 and the second connector 140 of the connector assembly 120 into place, while a second assembly apparatus is configured to press the position assurance apparatus 150 into the opening 146 of the second connector 140 and turn on the signal circuit through the first connector 130.

An embodiment of the present application further provides a method of assembling a connector assembly 120, including:

plugging a first connector 130 and a second connector 140 of the connector assembly 120 into place;

pressing a position assurance apparatus 150 into an opening 146 of the second connector 140 and turn on a signal circuit through the first connector 130.

In some embodiments, the method of assembling the connector assembly 120 further includes: operating a limiting member to prevent the position assurance apparatus 150 from being pressed into the opening of the second connector 140 and turning on the signal circuit through the first connector 130 when the first connector 130 and the second connector 140 are not plugged into place.

Referring to FIGS. 14A-14F, a method of assembling a connector assembly 120 shall be described in combination with these drawings. It should be illustrated that although the above drawings illustrate an embodiment of the connector assembly 120, operation methods of other alternative embodiments of the connector assembly 120 are also easily understood by those skilled in the art.

Figure 14A:
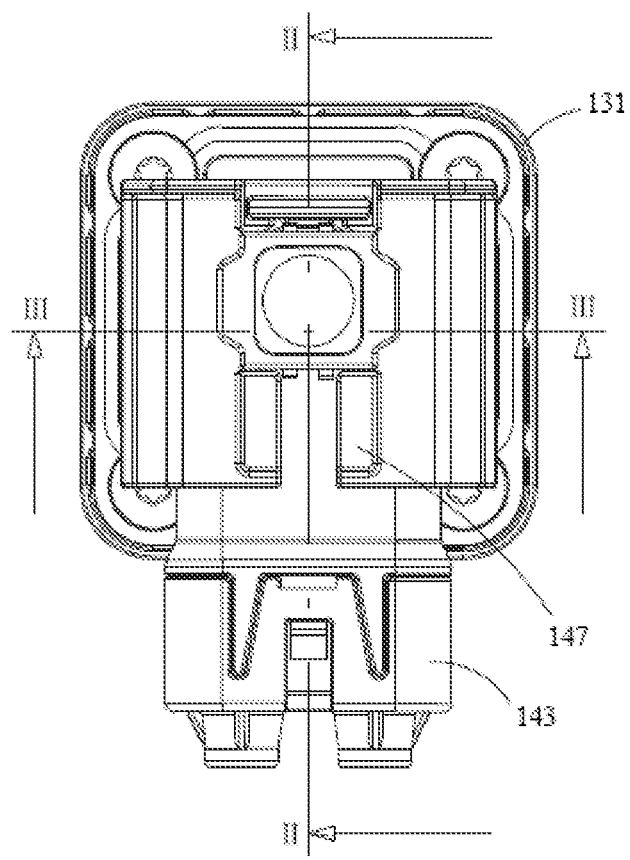
FIGS. 14A-14C show a connector assembly before a position assurance apparatus according to the present application is assembled in place, where
Figure 14B:
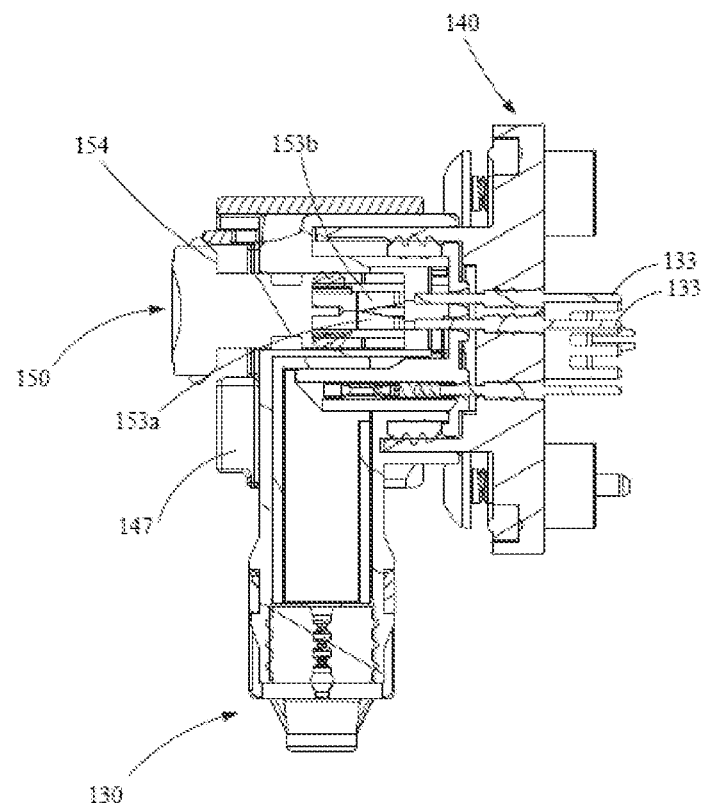
Figure 14C:
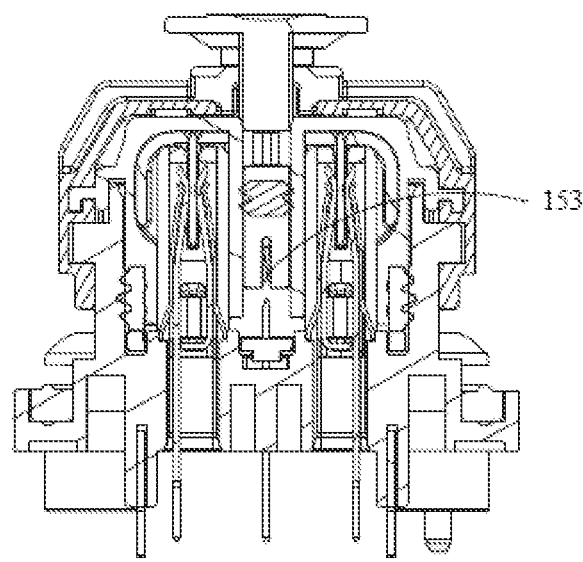

Specifically, the method mainly includes the following three steps:

(i) Referring to FIGS. 14A-14C, when a first connector 130 and a second connector 140 of the connector assembly 120 are not plugged into place, the limiting member, such as a step portion 147 of a sliding cover 145 is operated so that the step portion 147 abuts against an abutting portion 154 of a position assurance apparatus 150 to prevent the position assurance apparatus 150 from being pressed into an opening 146 of the second connector 140 and turning on a signal circuit of a circuit board 103 through a LIN line welding leg 133 of the first connector 130.

Figure 14D:
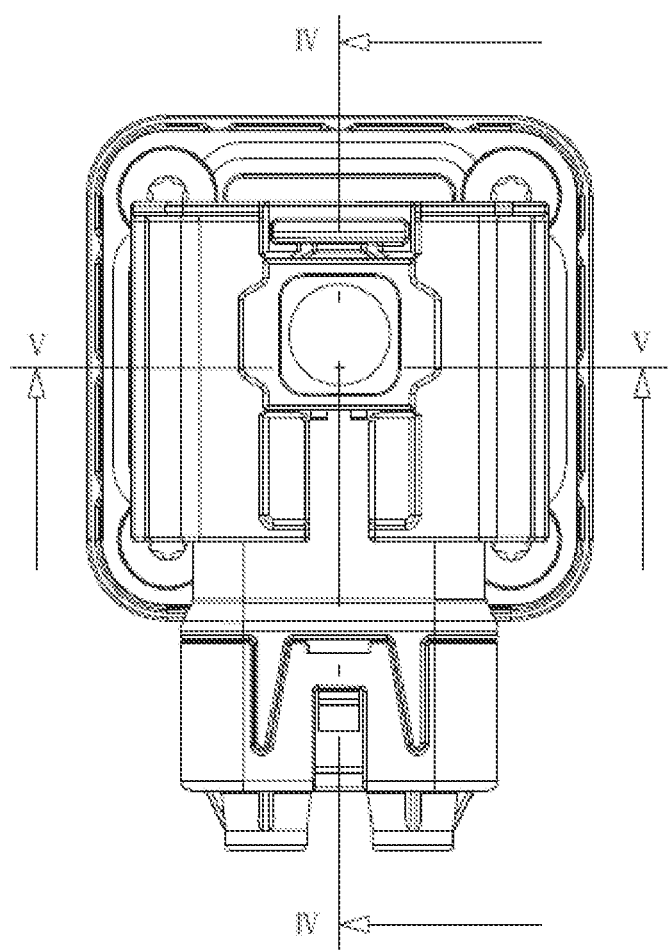
FIGS. 14D-14F show a connector assembly after a position assurance apparatus according to the present application is assembled in place, where
Figure 14E:
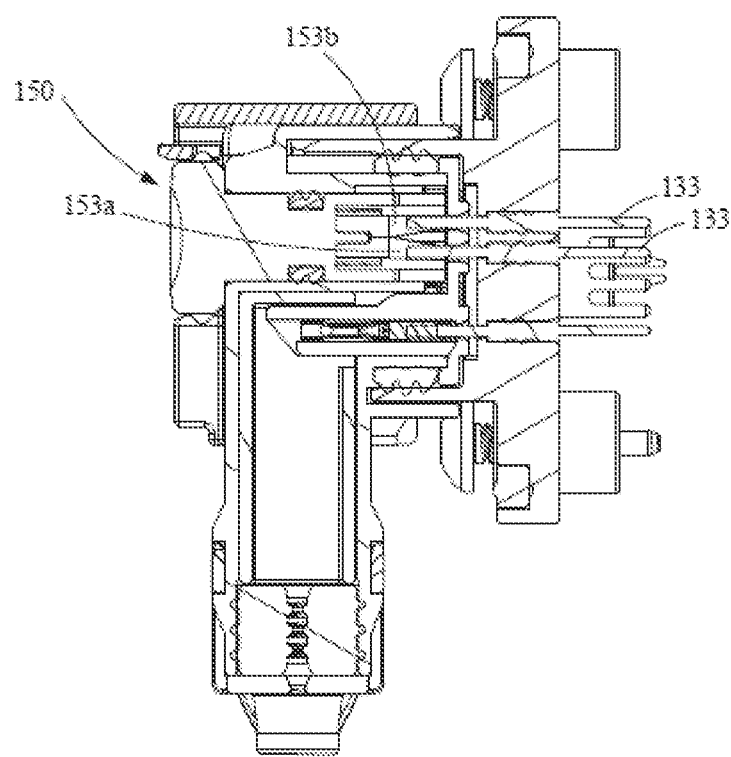
Figure 14F:
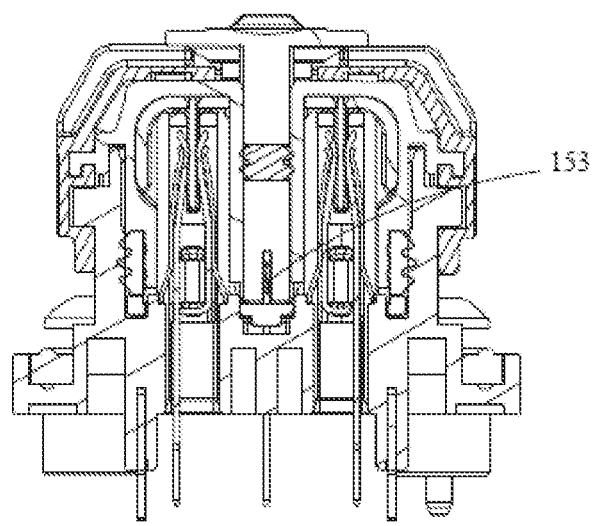

(ii) Referring to FIGS. 14D-14F, the sliding cover 145 is moved so that the step portion 147 of the sliding cover 145 no longer abuts against the abutting portion 154 of the position assurance apparatus 150 while the first connector 130 and the second connector 140 of the connector assembly 120 are plugged into place.

(iii) Continuing to refer to FIGS. 14D-14F, the position assurance apparatus 150 is pressed into the opening 146 of the second connector 140 and the signal circuit of the circuit board 103 is turned on through the first connector 130. Specifically, when the position assurance apparatus 150 is pressed into the opening 146 of the second connector 140, a first connecting portion 153a and a second connecting portion 153b of the position assurance apparatus 150 are respectively electrically connected to LIN line welding legs 133, thereby turning on the signal circuit of the circuit board 103.

By providing the limiting member when the first connector 130 and the second connector 140 of the connector assembly 120 are not plugged into place, the position assurance apparatus 150 may be prevented from being pressed into the opening 146 of the second connector 140 and further turning on a signal line when the connector assembly 120 is not plugged into place, which may ensure accuracy of detection. For those skilled in the art, it may be necessary to increase or decrease steps in the above method, and such modifications should also fall within the protection scope of the present application.

Figure 15:
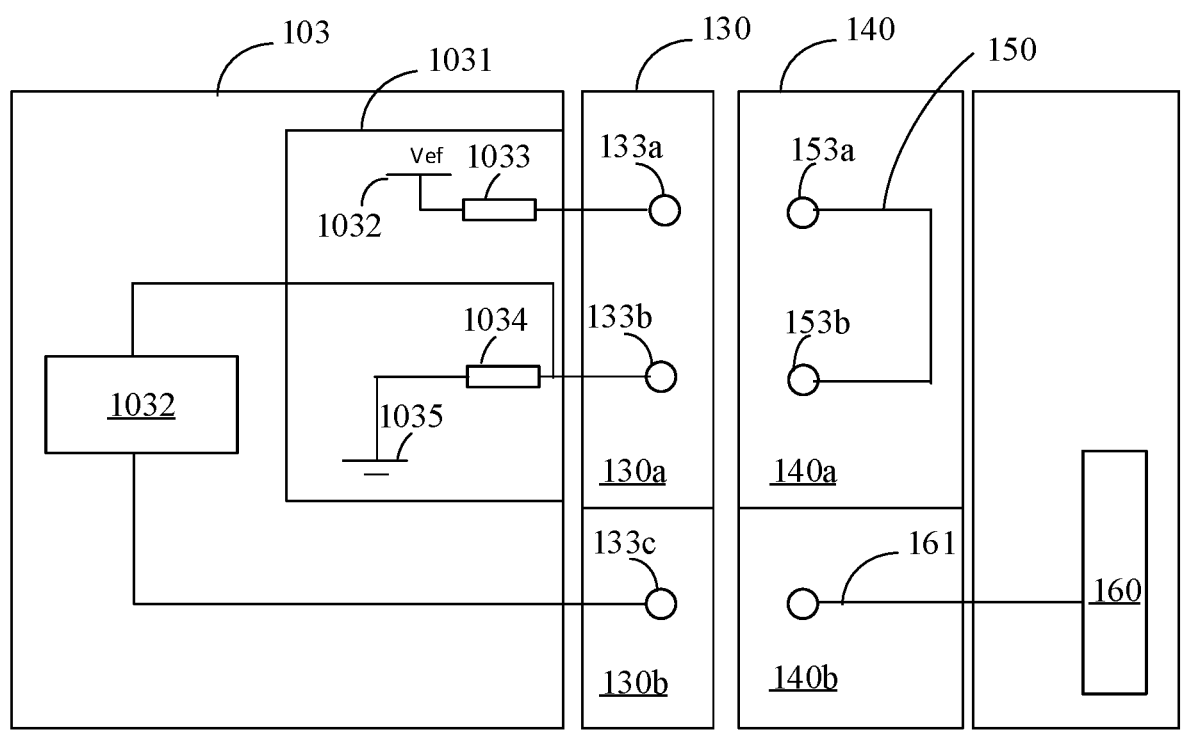
FIG. 15 is a schematic diagram of an overall architecture according to an embodiment of the present application.

FIG. 15 shows a schematic diagram of another embodiment according to the present application. As shown in FIG. 15, a first connector 130 is connected to a circuit board 103, and a second connector 140 is connected to a power consumption apparatus, such as a vehicle controller 160 of a vehicle.

A first connecting portion 153a and a second connecting portion 153b of the position assurance apparatus 150 are electrically connected to a signal circuit 1031 through the first connector 130, so that the signal circuit 1031 is turned on when the first connector 130 and the second connector 140 are plugged into place.

In an embodiment, as shown in FIG. 15, the first connector 130 may include: a conductive portion 130a configured to turn on the signal circuit 1031 and the position assurance apparatus 150 when the first connector 130 and the second connector 140 are plugged into place; a communication portion 130b configured to receive a notification signal from a battery management system 1032, and transmit the notification signal to a vehicle controller 160 through the second connector 140 to notify the vehicle controller 160 that the first connector 130 and the second connector 140 have been plugged into place.

In this embodiment, the conductive portion 130a and the communication portion 130b are simultaneously provided in the first connector 130, that is, the conductive portion 130a and the communication portion 130b are integrated into one first connector 130. In this way, on the one hand, space and cost may be saved, and on the other hand, multiple connectors may be no longer used, thereby reducing failure rate and improving reliability of the connector.

The conductive portion 130a may include a first LIN line welding leg 133a and a second LIN line welding leg 133b configured to turn on the signal circuit 1031 and the position assurance apparatus 150. When the first connector 130 and the second connector 140 are plugged into place, the first connecting portion 153a and the second connecting portion 153b of the position assurance apparatus 150 are respectively electrically connected to the first LIN line welding leg 133a and the second LIN line welding leg 133b so as to turn on the signal circuit 1031.

The communication portion 130b may include a third LIN line welding leg 133c configured to receive the notification signal from the battery management system 1032.

As shown in FIG. 15, the battery management system 1032 may detect whether the signal circuit 1031 is turned on, and generate the notification signal according to a detection result, and then use the communication portion 130b of the second connector 140, for example, the third LIN line welding leg 133c, to transmit the notification signal to the vehicle controller 160 to notify the vehicle controller 160 whether the first connector 130 and the second connector 140 are plugged into place.

Optionally, as shown in FIG. 15, the signal circuit 1031 may include a power supply 1032, a first load 1033, a second load 1034 and a ground terminal 1035. One end of the first load 1033 is connected to the power supply 1032, the first LIN line welding leg 133a is connected to the other end of the first load 1033, and one end of the second load 1034 is connected to the ground terminal 1035, the second LIN line welding leg 133b and the battery management system 1032 are connected to the other end of the second load 1034.

When the first connector 130 and the second connector 140 are plugged into place, the first connecting portion 153a and the second connecting portion 153b of the position assurance apparatus 150 are respectively connected to the first LIN line welding leg 133a and the second LIN line welding leg 133b, thereby electrically connecting the first LIN line welding leg 133a and the second LIN line welding leg 133b. In this case, the signal circuit 1031 is turned on, and the battery management system 1032 detects a non-zero voltage. The battery management system generates a first notification signal based on the non-zero voltage, and the first notification signal is transmitted to the vehicle controller 160 through the third LIN line welding leg 133c for notifying the vehicle controller 160 that the first connector 130 and the second connector 140 have been plugged into place.

When the first connector 130 and the second connector 140 are not plugged into place, the first connecting portion 153a and the second connecting portion 153b of the position assurance apparatus 150 are not electrically connected to the first LIN line welding leg 133a and the second LIN line welding leg 133b, so that the first LIN line welding leg 133a and the second LIN line welding leg 133b are disconnected. In this case, the signal circuit 1031 is not turned on, and the battery management system 1032 detects a zero voltage. The battery management system generates a second notification signal based on the zero voltage, and the second notification signal is transmitted to the vehicle controller 160 through the third LIN line welding leg 133c to notify the vehicle controller 160 that the first connector 130 and the second connector 140 are not plugged into place.

Optionally, a distance between the first LIN line welding leg 133a and the second LIN line welding leg 133b is less than a distance between the third LIN line welding leg 133c and the first LIN line welding leg 133a or the second LIN line welding leg 133b. In this way, interference with the third LIN line welding leg 133c may be prevented when the position assurance apparatus 150 is connected to the first connector 130.

Optionally, the first LIN line welding leg 133a, the second LIN line welding leg 133b and the third LIN line welding leg 133c are arranged in a row.

In an embodiment, as shown in FIG. 15, the second connector 140 may include: a first guide portion 140a configured to guide a conductive portion 130a to be connected to a position assurance apparatus 150; a LIN line 161; and a second guide portion 140b configured to guide a communication portion 130b to be connected to the LIN line 161. A notification signal from a battery management system 1032 is transmitted to a vehicle controller 160 through a connection between the communication portion 130b and the LIN line 161 when a first connector 130 and a second connector 140 are plugged into place, so as to notify the vehicle controller 160 that the first connector 130 and the second connector 140 are plugged into place.

In this embodiment, the first guide portion 140a and the second guide portion 140b are simultaneously provided in the second connector 140, so that one connector may be used to implement connection and guidance of the conductive portion 130a and the communication portion 130b. In this way, on the one hand, space and cost may be saved, and on the other hand, multiple connectors may be no longer used, thereby reducing failure rate and improving reliability of the connector.

Optionally, the first guide portion 140a may include: a first via and a second via, and positions of the first via and the second via correspond to the first LIN line welding leg 133a and the second LIN line welding leg 133b of the conductive portion 130a. And the second guide portion 140b may include a third via, and a position of the third via corresponds to a third LIN line welding leg 133c of the communication portion 130b.

Optionally, a distance between the first via and the second via is less than a distance between the third via and the first via or the second via. In this way, interference with the third LIN line welding leg 133c may be prevented when the position assurance apparatus 150 is connected to the first connector 130.

Optionally, the first via, the second via and the third via are arranged in a row.

The LIN line 161 is configured to communicate the notification signal in a serial communication protocol. Compared to a controller area network (CAN) bus, the LIN line may further save the cost.

In an embodiment, a battery management system 1032 may include: a detection unit configured to detect whether a signal circuit 1031 is turned on; a processing unit configured to generate a notification signal according to a detection result; and an output unit configured to transmit the notification signal to a vehicle controller 160 through a second connector 140 to notify the vehicle controller 160 whether the first connector 130 and the second connector 140 are plugged into place.

Specifically, the detection unit is connected to the signal circuit 1031, for example, connected between a second load 1034 and a second LIN line welding leg 133b to obtain a voltage signal; and the output unit is connected to a third LIN line welding leg 133c to transmit the notification signal to the vehicle controller 160 through the third LIN line welding leg 133c.

The detection unit detects whether the signal circuit 1031 is turned on by detecting whether the signal circuit 1031 has a voltage signal. Optionally, when the voltage signal is a first value, such as a non zero value, the detection unit detects that the signal circuit 1031 is turned on, and the notification signal generated by the processing unit is a first notification signal configured to notify the vehicle controller 160 that the first connector 130 and the second connector 140 have been plugged into place, and when the voltage signal is a second value, such as a zero voltage, the detection unit detects that the signal circuit 1031 is not turned on, and the notification signal generated by the processing unit is a second notification signal configured to notify the vehicle controller 160 that the first connector 130 and the second connector 140 are not plugged into place.

The technical solution of the embodiment shown in FIG. 15 may be applied to a low voltage battery, for example, a 12V battery, but this is not limited in the embodiments of the present application. For the low voltage battery, since s battery voltage is not high, the conductive portion 130a and the communication portion 130b may be integrated into one first connector 130, for example, the first connector 130 simultaneously includes the first LIN line welding leg 133a, the second LIN line welding leg 133b and the third LIN line welding leg 133c. On the one hand, it can detect whether the first connector 130 and the second connector 140 are plugged into place and notify the vehicle controller 160, and on the other hand, it can save space, cost and improve reliability.

Although the position assurance apparatus, the connector assembly, the battery, the power consumption apparatus, the structure of the connector assembly system, and the method of assembling the connector assembly according to the present application have been described above with reference to several embodiments, those of ordinary skill in the art should be appreciated that the above examples are merely for illustration and not as a limitation on the present application. For example, in addition to a sliding limiting member and a rotating limiting member described in the specification, other types of limiting members or the like may also be designed based on the common knowledge in the art. Therefore, modifications and variations of the present application may be made within an essential spirit of the claims, and these modifications and variations shall fall within the scope of the claims of the present application. In particular, the technical features mentioned in each embodiment may be combined in any manner, as long as there is no structural conflict. The present application is not limited to the specific embodiments disclosed herein, but includes all technical solutions falling within the scope of the claims.

What is claimed is:

1. A position assurance apparatus, comprising:
a first connecting portion; and
a second connecting portion configured to be electrically connected to the first connecting portion;
wherein:
the first connecting portion and the second connecting portion are configured to be electrically connected to a signal circuit through a first connector, so that the signal circuit is turned on in response to the first connector and a second connector being plugged into place;
the first connector comprises: a first local interconnect network (LIN) line welding leg and a second LIN line welding leg; and
the first connecting portion and the second connecting portion are configured to be electrically connected to the first LIN line welding leg and the second LIN line welding leg, respectively, to turn on the signal circuit in response to the first connector and the second connector being plugged into place.

2. The position assurance apparatus according to claim 1, wherein the first connecting portion comprises two oppositely arranged elastic pieces, each of the elastic pieces has an elastic contact portion, and the elastic contact portion is configured to be electrically connected to the first connector.

3. The position assurance apparatus according to claim 2, wherein at least one of the two elastic pieces has an indentation, and the indentation is configured to reduce a distance between the elastic contact portions of the two elastic pieces, in order to ensure that at least a part of the first connector plugged between the elastic contact portions of the two elastic pieces is in close contact with the elastic contact portions.

4. A first connector, comprising:
a protruding portion configured to be plugged into a second connector;

a conductive portion configured to turn on a signal circuit and a position assurance apparatus in response to the first connector and the second connector being plugged into place; and a communication portion configured to receive a notification signal from a battery management system, and transmit the notification signal to a vehicle controller through the second connector to notify the vehicle controller that the first connector and the second connector have been plugged into place.

5. The first connector according to claim 4, wherein the conductive portion comprises a first local interconnect network (LIN) line welding leg and a second LIN line welding leg configured to turn on the signal circuit and the position assurance apparatus.

6. The first connector according to claim 5, wherein the communication portion comprises a third LIN line welding leg configured to receive the notification signal from the battery management system.

7. The first connector according to claim 6, wherein a distance between the first LIN line welding leg and the second LIN line welding leg is less than a distance between the third LIN line welding leg and the first LIN line welding leg or the second LIN line welding leg.

8. The first connector according to claim 6, wherein the first LIN line welding leg, the second LIN line welding leg, and the third LIN line welding leg are arranged in a row.

9. A second connector, comprising:
a recessed portion configured to be plugged with a first connector, the first connector comprising a conductive portion and a communication portion;
a first guide portion configured to guide the conductive portion to be connected to a position assurance apparatus;
a local interconnect network (LIN) line; and
a second guide portion configured to guide the communication portion to be connected to the LIN line, a signal from a battery management system being transmitted to a vehicle controller through a connection between the communication portion and the LIN line in response to the first connector and the second connector being plugged into place, so as to notify the vehicle controller that the first connector and the second connector are plugged into place.

10. The second connector according to claim 9, wherein the LIN line is configured to transmit the notification signal in a serial communication manner.

11. The second connector according to claim 9, wherein the first guide portion comprises: a first via and a second via, and positions of the first via and the second via correspond to a first LIN line welding leg and a second LIN line welding leg of the conductive portion.

12. The second connector according to claim 11, wherein the second guide portion comprises a third via, and a position of the third via corresponds to a third LIN line welding leg of the communication portion.

13. The second connector according to claim 12, wherein a distance between the first via and the second via is less than a distance between the third via and the first via or the second via.

14. The second connector according to claim 12, wherein the first via, the second via, and the third via are arranged in a row.

* * * * *